US008682689B1

(12) United States Patent
Means et al.

(10) Patent No.: US 8,682,689 B1
(45) Date of Patent: Mar. 25, 2014

(54) PATIENT FINANCIAL ADVOCACY SYSTEM

(75) Inventors: Jeffrey D. Means, Lebanon, NH (US);
C. Shane Colley, Chicago, IL (US);
Paul T. Cottey, Chicago, IL (US);
Rafael Esleyer, Chicago, IL (US)

(73) Assignee: Accretive Health Inc, Chicago, IL (US)

( * ) Notice: Subject to any disclaimer, the term of this patent is extended or adjusted under 35 U.S.C. 154(b) by 242 days.

(21) Appl. No.: 12/924,861

(22) Filed: Oct. 7, 2010

(51) Int. Cl.
*G06Q 50/00* (2012.01)

(52) U.S. Cl.
USPC .............................................. 705/2

(58) Field of Classification Search
USPC ...................................... 705/2, 4, 3
See application file for complete search history.

(56) References Cited

U.S. PATENT DOCUMENTS

| | | | |
|---|---|---|---|
| 7,672,858 B2 | 3/2010 | Tolan et al. | |
| 2003/0212618 A1 | 11/2003 | Keys et al. | |
| 2005/0197954 A1 | 9/2005 | Maitland et al. | |
| 2006/0143049 A1* | 6/2006 | Dean ................................ | 705/4 |
| 2006/0190334 A1 | 8/2006 | Smith | |
| 2006/0198336 A1 | 9/2006 | Major et al. | |
| 2006/0287947 A1 | 12/2006 | Toms | |
| 2006/0293928 A1* | 12/2006 | Schumacher et al. ............. | 705/4 |
| 2007/0038487 A1* | 2/2007 | McCarthy ......................... | 705/4 |
| 2007/0050219 A1* | 3/2007 | Sohr et al. ......................... | 705/4 |
| 2007/0208640 A1 | 9/2007 | Banasiak et al. | |
| 2007/0219885 A1 | 9/2007 | Banasiak et al. | |
| 2008/0103826 A1 | 5/2008 | Barrett | |
| 2008/0189202 A1 | 8/2008 | Zadoorian | |
| 2008/0208640 A1 | 8/2008 | Thomas et al. | |
| 2009/0192827 A1* | 7/2009 | Andersen et al. ................. | 705/4 |
| 2009/0299764 A1 | 12/2009 | Ambrose | |

OTHER PUBLICATIONS

The Affordable Care Act; www.healthcare.gov.*
New York State, Office of Victim Services; Help for Crime Victims, 2010.*
U.S. Appl. No. 12/194,721, filed Aug. 20, 2008.

* cited by examiner

*Primary Examiner* — John Pauls
(74) *Attorney, Agent, or Firm* — John S. Paniaguas; Katten Muchin Rosenman LLP

(57) ABSTRACT

A patient financial advocacy system is disclosed for identifying potential funding sources for uninsured patients and for the patient portion of healthcare debts that are covered by managed healthcare plans by automating the identification of potential funding sources and automating the collection of data required by such potential funding sources. The system is an automated system ad includes three stages, namely, a detection stage; an execution stage and a measurement stage. In the detection stage, a multi-tiered questionnaire is used during a patient interview to identify potential funding sources. In accordance with an important aspect of the invention, the questionnaire is structured to find the funding source with the highest yield. A rules engine is programmed to analyze the patient's answers to the questions and identify a potential funding source. In the execution stage, the rules engine is further programmed with specific questionnaires structured to gather all of the required data of the identified funding source. The execution stage identifies all steps required for applying for the specific funding source. In the measurement stage, the system determines the best possible yield for all identified patient funding sources.

17 Claims, 26 Drawing Sheets

PFA Screening Questions

| Order | Question | Tier | Funding Source |
|---|---|---|---|
| 1 | Are you being treated as a result of an accident or injury? | 1 | |
| 2 | Do you have Medical Insurance? | 1 | Liability Upgrade (MVA, Work Comp) |
| 3 | Were you involved in an Auto Accident? | 1 | |
| 4 | Do you have auto insurance OR is the vehicle covered under someone else's policy? | 1 | Auto Insurance |
| 5 | Do you have auto insurance OR is the vehicle covered under someone else's policy? | 1 | WI Auto Insurance Liability |
| 6 | Has the patient filed a claim with their Auto Insurance? | 1 | WI Pending Auto Insurance |
| 7 | Will the patient file a claim with the auto insurance company? | 1 | Auto Insurance |
| 8 | Did the patient NOT file an Auto Liability claim? | 1 | |
| 9 | Are you certain that you are not covered under any insurance? | 1 | |
| 10 | Were you a driver in an uninsured vehicle (other than your own), a passenger in an uninsured vehicle, or a pedestrian struck by the vehicle? | 1 | Uninsured Auto |
| 11 | Were you a passenger or pedestrian? | 1 | Uninsured Auto |
| 12 | Were you injured while performing your duties at work? | 1 | Worker compensation |
| 13 | Were you injured while performing your duties at work? | 1 | |
| 14 | Was the employer worker's comp carrier information found on the WCRB Website? | 1 | WI Worker's Compensation |
| 15 | Did you find the Worker's Comp Carrier on the WCRB website? | 1 | Worker compensation |
| 16 | To submit a Workers Comp Claim, we need the Workers Comp Carrier Name, Address, and Claim #. Is any of this information missing? | 1 | WI Worker's Compensation |
| 17 | Was this a non-work related injury on private or public property (business or residence)? | 1 | |
| 18 | Have you filed a liability claim with the property owner? | 1 | WI Public and Private Liability |
| 19 | Will you be filing a liability claim with the property owner? | 1 | WI Public and Private Liability |
| 20 | Have you or will you be filing a liability claim with the property owner where the injury occurred? | 1 | Public Liability Insurance |
| 1 | Have you already been through a Medicaid application process (i.e. Spend Down, Baby Add, Pending Application)? | 2 | |
| 2 | Is the patient a baby that needs to be added to an existing Medicaid policy? | 2 | Medicaid Baby Add |
| 3 | Does the patient have Medicaid with a Spend Down (deductible)? | 2 | Medicaid Spend Down |
| 4 | Have we taken a TennCare application for this patient? | 2 | TN Medicaid |
| 5 | Have we taken a Medicaid application for this patient at this facility within the past 6 months? | 2 | |
| 6 | Is your application currently pending with DHS? | 2 | Pending Medicaid |
| 7 | Is your application currently pending with DHS in Michigan? | 2 | HF Medicaid |
| 8 | Have we taken a Disability application on this patient? | 2 | Federal Disability |
| 9 | Has the patient already applied for Medicaid at a DHS office within the past 6 months? | 2 | |
| 10 | Is your application currently pending with DHS in Michigan? | 2 | HF Medicaid |
| 11 | Is your application currently pending with DHS? | 2 | Pending Medicaid |
| 12 | *** [Are you between the ages of 18 and 26?] | 2 | |
| 13 | Are you a NH Resident? | 2 | |
| 14 | Is the patient single? | 2 | |
| 15 | Is at least one parent currently covered by Health Insurance (NH)? | 2 | |

*Fig. 1A*

| # | Question | Col | Category |
|---|---|---|---|
| 16 | Have you or your spouse had any health insurance coverage through any source SINCE SEPTEMBER 1, 2008 (should you have it today)? [Screening for Hidden Ins and COBRA] | 2 | NH Parental Insurance Law |
| 17 | Would your parent(s) be willing to pursue adding you to their policy under NH Law? | 2 | |
| 18 | Does your current employer (spouse's employer) offer health insurance benefits? | 2 | Hidden Insurance |
| 19 | Have you completed the enrollment forms at your place of employment? | 2 | |
| 20 | Could the patient have an enrollment issue (example: name spelling, name change, marital status change, etc.) | 2 | |
| 21 | Are you covered under your parents insurance? | 2 | Hidden Insurance |
| 22 | Does the patient insist they have active coverage [other than Medicaid]? | 2 | WI Parental Coverage |
| 23 | Are you able to get coverage under your college or university? | 2 | Hidden Insurance |
| 24 | Have you had active coverage under a group health insurance plan through a previous employer within the past 90 days? [COBRA] | 2 | Student Coverage |
| 25 | Have you had active coverage under a group health insurance plan through a previous employer and were let go between September 1, 2008 and December 31, 2008? [COBRA] | 2 | COBRA |
| 26 | *** [Is the patient between 19 & 25 years old?] | 2 | COBRA |
| 27 | Are you a full time student ? | 2 | |
| 28 | Is the patient a military veteran, currently on Active Duty, or the dependent of a person on Active Duty? | 2 | Parental Coverage |
| 29 | Does the patient have VA disability benefits? | 2 | |
| 30 | Does the patient have VA disability benefits OR is the patient enrolled in the VA Health Care System? | 2 | |
| 31 | Is the patient being treated as a result of a service related condition? | 2 | Military |
| 32 | Has the patient been seen in a VA clinic or by a VA doctor within the past 24 months? | 2 | Military |
| 33 | Is the patient currently on active duty or retired from active duty? | 2 | |
| 34 | Is the patient being treated as an Emergency ? | 2 | Military |
| 35 | Has the patient been on active duty within the past 90 days? | 2 | |
| 36 | Has the patient returned from mobilization within the past 90 days? | 2 | Military |
| 37 | Is the patient the dependent of a person on Active Duty ? | 2 | Military |
| 38 | Have we taken a Medicaid application for this patient at this or any other facility within the past 30 days? | 2 | |
| 39 | Are you a registered member of a recognized Indian tribe? | 2 | WI State Medicaid |
| 40 | Did we take a TX Medicaid application on this patient? | 2 | Indian Health Services |
| 41 | Are you visiting the US on a temporary basis? [Student/Work/Travel/Medical Visa] | 2 | TX Medicaid |
| 42 | Has an application been completed? | 2 | Foreign Citizen |
|  |  |  | MA State Medicaid |
| 1 | Has patient's medical screening been complete? | 3 | |
| 2 |  | 3 | Pure Self Pay |
| 1 | Are you a MI Resident? | 4 | |
| 2 | *** [Is the patient below 200% of FPL?] | 4 | |
| 3 | Are you pregnant or being treated as a result of a pregnancy? (No other children in the home) | 4 | MI Childrens Medicaid |
| 4 | Was the patient born in a country other then the US? (Where were you born? Indicate country of birth on application.) | 4 | |

*Fig. 1A (cont.)*

| | | | |
|---|---|---|---|
| 5 | Was the patient born in a country other then the US? (Where were you born? Indicate country of birth on application.) | | |
| 6 | Does the patient have valid identification documents? | 4 | Section 1011 |
| 7 | *** [Is the patient 18 years old or younger?] | 4 | Section 1011 |
| 8 | Are you the caretaker of minor children (17 years old and younger)? | 4 | MI Childrens Medicaid |
| 9 | Are you the caretaker of minor children (17 years old and younger)? | 4 | MI Family Medicaid |
| 10 | ***[Is the patient 21 to 64 years old?] | 4 | HF Medicaid |
| 11 | Is the patient's income $316 per month or less (if single) OR $425 per month or less (if married)? | 4 | ABW |
| 12 | *** [Is the patient below 100% of FPL?] | 4 | |
| 13 | *** [Is the patient 19 or 20 years old?] | 4 | MI Family Medicaid |
| 14 | *** [Is the patient 19 or 20 years old?] | 4 | HF Medicaid |
| 15 | Are you the primary caretaker of a person who is handicapped or disabled? | 4 | |
| 16 | Is the handicapped or disabled person under the age of 18? | 4 | MI Family Medicaid |
| 17 | *** [Is the patient below 100% of FPL?] | 4 | |
| 18 | *** [Is the patient between 19 and 21 years old?] | 4 | MI Family Medicaid |
| 19 | Is the handicapped or disabled person under the age of 18? | 4 | HF Medicaid |
| 20 | Are you between the ages of 21 and 65? | 4 | |
| 21 | Are you below 25% of FPL? | 4 | ABW |
| 22 | Is the patient being treated as an Emergency or Out Patient? | 4 | ABW |
| 23 | Are you a VT Resident (or legal resident alien for more than 5 years)? | 4 | |
| 24 | *** [Is the patient below 300% of FPL?] | 4 | |
| 25 | Are you a VT Resident ? | 4 | |
| 26 | Are you below 150% of FPL ? | 4 | VT Medicaid |
| 27 | *** [Is the patient under the age of 18?] | 4 | Dr Dynasaur |
| 28 | Are you between 150% and 185% of FPL? | 4 | |
| 29 | Are you the caretaker of a child under the age of 18? | 4 | VT Medicaid |
| 30 | *** [Is the patient below 200% of FPL?] | 4 | |
| 31 | Are you pregnant or is treatment related to a pregnancy? | 4 | Dr Dynasaur |
| 32 | Are you the caretaker of a blind or disabled person? | 4 | VT Medicaid |
| 33 | *** [Is the patient between 18 and 21 years old?] | 4 | |
| 34 | *** [Is the patient below 185% of FPL?] | 4 | |
| 35 | Are your HOUSEHOLD assets below the asset limit? (Bank accounts, 401k, IRA, etc. totaling less than $2000/individual; $3000/2 ppl; +$150/each add'l person) | 4 | VT Medicaid - Transitional Youth |
| 36 | Are you a female between 18 and 64 years old? | 4 | |
| 37 | *** [Is the patient over the age of 65?] | 4 | |
| 38 | *** [Is the patient below 185% of FPL?] | 4 | |
| 39 | Are you having a women's health exam? | 4 | VT Medicaid |
| 40 | Are you between 150% and 300% of FPL | 4 | |
| 41 | *** [Is the patient below 185% of FPL?] | 4 | |
| 42 | Are you a caretaker of children under the age of 18 in the home? | | |
| 43 | Are you the caretaker of children under the age of 18 in the home? | | |
| 44 | Are you below the asset limit? (Bank accounts, 401k, IRA, etc. totaling less than $2000/individual; $3000/2 ppl; +$150/each add'l person) | 4 | VT Medicaid |

*Fig. 1A (cont.)*

| | | | |
|---|---|---|---|
| 45 | Are you below the asset limit? (Bank accounts, 401k, IRA, etc. totaling less than $2000/individual; $3000/2 ppl; +$150/each add'l person) | 4 | VT Medicaid |
| 46 | Have you been without health insurance for at least 12 months? | 4 | VHAP |
| 47 | Have you had insurance within the past 12 months but no longer have coverage because of one of the following: job loss (and not COBRA eligible), divorce, ineligible for Medicaid, no longer covered by parent's plan? | | |
| 48 | *** [Is the patient below 150% of FPL?] | 4 | VHAP |
| 49 | *** [Is the patient between the age of 18 and 64 years?] | 4 | |
| 50 | Have you been without health insurance for at least 12 months? | 4 | VHAP |
| 51 | Have you had insurance within the past 12 months but no longer have coverage because of one of the following: job loss (and not COBRA eligible), divorce, ineligible for Medicaid, no longer covered by parent's plan? | 4 | |
| 52 | Are you under the age of 19? | 4 | VHAP |
| 53 | *** [Is the patient above 150% of FPL?] | 4 | Dr Dynasaur |
| 54 | Are you pregnant or is treatment related to a pregnancy? | 4 | Dr Dynasaur |
| 55 | *** [Is the patient between the age of 18 and 64 years?] | 4 | |
| 56 | Have you been without health insurance for at least 12 months? | 4 | Catamount Health |
| 57 | Are you a NH Resident? | 4 | |
| 58 | Have you had insurance within the past 12 months but no longer have coverage because of one of the following: job loss (and not COBRA eligible), divorce, ineligible for Medicaid, no longer covered by parent's plan? | 4 | Catamount Health |
| 59 | Are you below 70% of FPL? | 4 | NH Medicaid |
| 60 | Are you a single adult? | 4 | |
| 61 | Are you a NH Resident (or legal resident alien for more than 5 years)? | 4 | |
| 62 | *** [Is the patient below 400% of FPL?] | 4 | NH Healthy Kids Medicaid |
| 63 | Are you under the age of 19? | 4 | NH Healthy Kids Medicaid |
| 64 | Are you below 150% of FPL? | 4 | NH Healthy Kids Medicaid |
| 65 | *** [Is the patient under the age of 19?] | 4 | |
| 66 | *** [Is the patient below 185% of FPL?] | 4 | NH Healthy Kids Medicaid |
| 67 | Are you pregnant or is treatment related to a pregnancy? | 4 | |
| 68 | *** [Is the patient above 185% of FPL?] | 4 | |
| 69 | Are you pregnant or is treatment related to a pregnancy? | 4 | NH Medicaid Spenddown |
| 70 | Are you below the asset limit? (Bank accounts, 401k, IRA, etc. totaling less than $2500/individual; $4000/2 ppl; +$100/each add'l person) | 4 | |
| 71 | Are you below 250% of FPL? | 4 | NH Healthy Kids Medicaid |
| 72 | Are you a female between 18 and 64 years old? | 4 | |
| 73 | Are you pregnant or is treatment related to a pregnancy? | 4 | |
| 74 | Are you the caretaker of children under the age 18 or a caretaker of a 19 or 20 year full-time student? | 4 | NH Medicaid |
| 75 | Are you having a women's health exam? | 4 | |
| 76 | Are you a single parent or is at least one parent absent from the home for a minimum of 30 days? | 4 | |
| 77 | Are you below the asset limit? (Bank accounts, 401k, IRA, etc. totaling less than $2500/individual; $4000/2 ppl; +$100/each add'l person) | 4 | NH Medicaid |
| 78 | *** [Is the patient below 70% FPL?] | 4 | |

*Fig. 1A (cont.)*

| # | Question | | Program |
|---|---|---|---|
| 79 | *** [Is the patient above 70% FPL?] | 4 | NH Medicaid Spenddown |
| 80 | Has the doctor told you or are you expecting that you will be out of work more than 30 days? Or will this reduce or limit your ability to provide financial support or care for your minor child/children? | | |
| 81 | Will this reduce or limit your ability to provide financial support or care for your minor child/children? | 4 | |
| 82 | Are you below the asset limit? (Bank accounts, 401k, IRA, etc. totaling less than $2500/individual; $4000/2 ppl; +$100/each add'l person) | 4 | |
| 83 | *** [Is the patient below 70% FPL?] | 4 | NH Medicaid |
| 84 | *** [Is the patient above 70% FPL?] | 4 | NH Medicaid Spenddown |
| 85 | Is the principle wage earner of the household currently working less then 25 hours per week? | 4 | |
| 86 | Are you below the asset limit? (Bank accounts, 401k, IRA, etc. totaling less than $2500/individual; $4000/2 ppl; +$100/each add'l person) | 4 | |
| 87 | Are you below the asset limit? (Bank accounts, 401k, IRA, etc. totaling less than $2500/individual; $4000/2 ppl; +$100/each add'l person) | 4 | |
| 88 | *** [Is the patient at or below 70% FPL?] | 4 | NH Medicaid |
| 89 | *** [Is the patient above 70% FPL?] | 4 | NH Medicaid Spenddown |
| 90 | *** [Is the patient over the age of 65?] | 4 | |
| 91 | Are you below the asset limit? (Bank accounts, 401k, IRA, etc. totaling less than $2500/individual; $3000/2 ppl; +$150/each add'l person) | 4 | |
| 92 | *** [Is the patient below 70% FPL?] | 4 | NH Medicaid |
| 93 | *** [Is the patient above 70% FPL?] | 4 | NH Medicaid Spenddown |
| 94 | *** [Is the patient a female between the ages of 18 and 64?] | 4 | |
| 95 | *** [Is the patient below 250% of FPL?] | 4 | BCCT |
| 96 | Are you having a women's health exam? | 4 | |
| 97 | *** [Is the patient a female between the ages of 18 and 64?] | 4 | |
| 98 | *** [Is the patient below 250% of FPL?] | 4 | BCCT |
| 99 | Are you having a women's health exam? | 4 | Ladies First |
| 100 | Are you having a women's health exam? | 4 | |
| 101 | *** [Is the patient above 200% FPL?] | 4 | |
| 102 | Are you pregnant or is treatment related to pregnancy | 4 | VT Medicaid Spenddown |
| 103 | Are you below the asset limit? | 4 | |
| 104 | Are you a Tennessee resident? | 4 | |
| 105 | Are you pregnant or is treatment related to a pregnancy? | 4 | TN Medicaid |
| 106 | Are you below 185% FPL? | 4 | |
| 107 | Are you aged less then 21? | 4 | |
| 108 | Are you below 133% FPL | 4 | TN Medicaid |
| 109 | Are you the legal guardian of a child 0-17 or a child age 18 who will gradutate high school by age 19 living in your home? | 4 | |
| 110 | Are you a single parent? | 4 | TN Emergency Medicaid |
| 111 | Is the patient going to be unable to care for the child (due to medical reasons) for the next 30 days? | 4 | TN Emergency Medicaid |
| 112 | Is the principal wage earner unable to perform their current job for the next 30 days due to an illness? | 4 | TN Emergency Medicaid |
| 113 | Is the principal wage earner working 35 hours per week or less and making minimum wage or less? | 4 | TN Emergency Medicaid |

*Fig. 1A (cont.)*

| | | | |
|---|---|---|---|
| 114 | Has the patient been diagnosed with Breast or Cervical Cancer? | 4 | |
| 115 | Has the patient been evaluated by a Tennessee early detection breast and cervical cancer center? | 4 | TN BCC |
| 116 | Is the patient Registered as Self Pay? | 4 | MA Self Pay |
| 117 | Is the patient receiving Emergency treatment? [TN Emergency Medicaid] | | |
| 118 | Is the SSN invalid or does the patient NOT have a SSN? | | |
| 119 | Has the patient volunteered that they are in the US illegally? (Indicate country of birth on application.) | 4 | TN Emergency Medicaid |
| 120 | Was the patient born in a country other then the US? (Where were you born? Indicate country of birth on application.) | 4 | TN Emergency Medicaid |
| 121 | Are you an IL Resident? | 4 | |
| 122 | *** [Is the patient below 200% of FPL?] | 4 | IL Childrens Medicaid |
| 123 | *** [Is the patient below the age of 19?] | 4 | IL Medicaid |
| 124 | Are you the caretaker of children under the age of 21? | 4 | |
| 125 | *** [Is the patient below 150% of FPL?] | 4 | IL Medicaid |
| 126 | Are you pregnant or being treated is the result of a pregnancy? (No other children in the home) | 4 | |
| 127 | Are you a DC Resident? | 4 | DC Alliance |
| 128 | *** [Is the patient between 19 and 65 years old?] | 4 | |
| 129 | *** [Is the patient below 200% of FPL?] | 4 | |
| 130 | Is the patient a female? | 4 | DC Alliance |
| 131 | Are you being treated as the result of a pregnancy? | 4 | |
| 132 | *** [Is the patient below 300% of FPL?] | 4 | |
| 133 | *** [Is the patient under the age of 19?] | 4 | DC Alliance |
| 134 | Are you a US Citizen? | 4 | |
| 135 | *** [Is the patient below 300% of FPL?] | 4 | DC Emergency Medicaid |
| 136 | Are you being treated for Emergency Care? | 4 | |
| 137 | *** [Is the patient below 200% of FPL?] | 4 | |
| 138 | Are you a Maryland resident? | 4 | MCHP |
| 139 | *** [Is the patient under 19 years old?] | 4 | |
| 140 | Are you a US Citizen? | 4 | |
| 141 | *** [Is the patient below 200% of FPL?] | 4 | |
| 142 | Is the patient a female? | 4 | MCHP |
| 143 | Are you being treated as the result of a pregnancy? | 4 | |
| 144 | Are you a US Citizen? | 4 | |
| 145 | *** [Is the patient below 250% of FPL?] | 4 | |
| 146 | Are you being treated for Emergency Care? | 4 | MD Emergency Medicaid |
| 147 | *** [Is the patient below 200% of FPL?] | 4 | |
| 148 | Is the patient receiving Emergency treatment? [Screening for Sect 1011] | 4 | |
| 149 | Are you a FL resident (or a Lawful Permanent Resident for 5 or more years)? | 4 | |
| 150 | ***[Is the Patient below 200% of FPL?] | 4 | FL Medicaid |
| 151 | ***[is the patient under 19 years of age]? | | |
| 152 | Are you between the ages of 18 and 21 (aged 19 or 20) and living with your parent(s) or a legal custodian? | 4 | |
| 153 | ***[is the patient below 100% of FPL]? | 4 | |

*Fig. 1A (cont.)*

| # | Question | | Program |
|---|---|---|---|
| 154 | Are your total assets (401K, IRA, checking, savings, etc.) less than $2,000.00 (include parent assets)? | | |
| 155 | Are your total assets (401K, IRA, checking, savings, etc.) more than $2,000.00 but less than $5K (include parent assets)? | 4 | FL Medicaid |
| 156 | ****[is the patient above 100% of FPL]? | 4 | FL Medicaid SOC |
| 157 | Are your total assets (401K, IRA, checking, savings, etc) less than $5,000.00 (include parent assets)? | | |
| 158 | Are you an IN resident? | 4 | FL Medicaid SOC |
| 159 | *** [Is the patient below 150% of FPL]? | 4 | |
| 160 | ***[is the patient below 185% of FPL]? | 4 | |
| 161 | ***[is the patient above 185% of FPL]? | 4 | |
| 162 | Are you pregnant or being treated as the result of a pregnancy? | 4 | Hoosier Healthwise |
| 163 | *** [Is the patient less then 19 years old?] | 4 | Hoosier Healthwise |
| 164 | Are you pregnant or is treatment related to a pregnancy? | 4 | FL Medicaid |
| 165 | *** [Is the patient under 100% of FPL?] | 4 | |
| 166 | Are you the caretaker of children in the home under the age of 19? | 4 | Hoosier Healthwise |
| 167 | Are you pregnant or is treatment related to a pregnancy? | 4 | FL Medicaid SOC |
| 168 | Are you the parent, or legal custodian, of a child under age 18 living in your home? | | |
| 169 | *** [Is the patient between 150% and 200% of FPL?] | 4 | |
| 170 | *** [Is the patient less then 19 years old?] | 4 | |
| 171 | ***[is the patient below 25% of FPL]? | 4 | |
| 172 | ***[is the patient above 25% of FPL]? | 4 | |
| 173 | Have you been without health insurance for at least 3 months? | 4 | Hoosier Healthwise Spend Down |
| 174 | *** [Is the patient between 18 and 65?] | | |
| 175 | Are your total assets (401K, IRA, checking, savings, etc) below $2,000.00? | 4 | FL Medicaid |
| 176 | *** [Is the patient below 250% of FPL?] | 4 | |
| 177 | Have you been screened and determined to need treatment through the Indiana Breast and Cervical Cancer Program? | 4 | Indiana BCCP |
| 178 | Are you an AL resident? | 4 | |
| 179 | Are your total assets (401K, IRA, checking, savings, etc) above $2,000.00 but less than $5K? | 4 | FL Medicaid SOC |
| 180 | Are your total assets (401K, IRA, checking, savings, etc) less than $5,000.00? | 4 | FL Medicaid SOC |
| 181 | Are you pregnant or receiving treatment related to a delivery that took place within the last 60 days? | 4 | |
| 182 | ***[Are you a child under 6 years of age?] | 4 | |
| 183 | ***[is the patient below 133% of FPL?] | 4 | |
| 184 | ***[is the patient below 150% of FPL?] | 4 | |
| 185 | ***[is the patient below 200% of FPL?] | 4 | |
| 186 | Is the patient a member of a family? | 4 | |
| 187 | ***[is the patient below 240% of FPL?] | 4 | |
| 188 | ***[is the patient between 6 and 18 years of age?] | 4 | |
| 189 | ***[is the patient below 100% of the FPL?] | 4 | |
| 190 | ***[is the patient below 133% of FPL?] | 4 | |
| 191 | ***[is the patient below 150% FPL?] | 4 | |
| 192 | Is the patient a member of a family? | 4 | |

*Fig. 1A (cont.)*

| | | | |
|---|---|---|---|
| 193 | ***[Is the patient below 240% of FPL?] | ◄ | |
| 194 | ***[Is the patient a woman?] | ◄ | |
| 195 | ***[Are you between 19 and 44 years of age?] | ◄ | |
| 196 | ***[Are you below 133% of FPL?] | ◄ | |
| 197 | Are you receiving treatment related to family planning? | ◄ | |
| 198 | ***[Are you under 65 years old?] | ◄ | |
| 199 | Is there a child under the age of 19, related to the patient, living in the home? | ◄ | FL Medicaid |
| 200 | ***[Is the patient below 13% of the FPL?] | ◄ | |
| 201 | Are you or do you have a dependent child under the age of 18 in the home? | ◄ | |
| 202 | ***[Are you 35% of FPL?] | ◄ | FL Medicaid |
| 203 | Do you live with an adult caretaker? | ◄ | |
| 204 | ***[Is the patient less than one year old?] | ◄ | |
| 205 | ***[Is the patient less than 200% FPL?] | ◄ | FL Medicaid |
| 206 | ***[Is the patient between 1 and 5 years old?] | ◄ | |
| 207 | ***[Is the patient less than 133% of FPL?] | ◄ | FL Medicaid |
| 208 | ***[Are you between 6 and 18 years old?] | ◄ | |
| 209 | ***[Is the patient less than 100% of FPL?] | ◄ | MediKids |
| 210 | ***[Is the patient between 1 and 5 years old?] | ◄ | |
| 211 | ***[Is the patient between 133% and 200% FPL?] | ◄ | FL Healthy Kids |
| 212 | ***[Are you between 5 and 8 years old?] | ◄ | |
| 213 | ***[Is the patient between 100% and 200% FPL?] | ◄ | |
| 214 | ***[Are you under 19 years of age?] | ◄ | |
| 215 | Does the patient have special behavioral or physical health needs and/or a chronic medical condition? | ◄ | FL Healthy Kids |
| 216 | Have you been screened for and been found to have breast or cervical cancer, including precancerous conditions through the NBCCEDP? | ◄ | |
| 217 | ***[Are you between the ages of 19 and 21?] | ◄ | FL Healthy Kids |
| 218 | ***[Is the patient above 200% of FPL]? | ◄ | FL Medicaid |
| 219 | ***[Is the patient below 200% FPL?] | ◄ | FL Pregnancy Medicaid |
| 220 | Are you under 19 years of age? | ◄ | |
| 221 | Are you living with a relative? | ◄ | |
| 222 | Are you pregnant? | ◄ | |
| 223 | Are you a GA resident? | ◄ | |
| 224 | ***[Are you between 6 and 19 years of age?] | ◄ | GA RSM |
| 225 | ***[Is the patient at or below 100% of FPL?] | ◄ | |
| 226 | ***[Is the patient between the ages of 1 and 5?] | ◄ | GA RSM |
| 227 | ***[Is the patient at or below 133% of FPL?] | ◄ | |
| 228 | ***[Is the patient less than 1 year old?] | ◄ | GA RSM |
| 229 | ***[Is the patient at or below 185% of FPL?] | ◄ | |
| 230 | Are you pregnant or an infant? | ◄ | GA RSM |
| 231 | ***[Is the patient at or below 200% of FPL?] | ◄ | |
| 232 | ***[Are you less than 19 years of age?] | ◄ | Peach Care |
| 233 | ***[Is the patient at or below 235% of FPL?] | ◄ | |
| 234 | ***[Is the patient female?] | ◄ | |

*Fig. 1A (cont.)*

| | | | |
|---|---|---|---|
| 235 | ***[Are you between 18 and 65 years old?] | 4 | |
| 236 | ****[Is the patient between 100% and 150% of FPL?] | 4 | |
| 237 | ***[Are you between 18 and 64 years of age?] | 4 | |
| 238 | Are you a resident of Alcona, Iosco, Ogemaw, or Oscoda county? | 4 | Northeastern Health Plan |
| 239 | Are you a Resident of Arenac, Clare, Gladwin, Isabella, Roscommon, or Osceola county? | 4 | Central Health Plan |
| 240 | Have you not had health insurance nor had access to health insurance in the last six months? | 4 | |
| 241 | ***[Is the patient at or below 200% FPL?] | 4 | |
| 242 | ***[Is the patient between 18 and 65 years of age?] | 4 | |
| 243 | Are you a legal US resident? | 4 | |
| 244 | Are you a resident of WI? | 4 | HIP |
| 245 | ***[Are you under the age of 19?] | 4 | Badger Care Plus |
| 246 | Are you on the waiting list for the BadgerCare CORE program OR are you adult with no children, making less than $22,000 a year without insurance available to you through work? | 4 | Badger Care CORE Program |
| 247 | ***[Is the patient at or below 200% of FPL?] | 4 | Badger Care Plus |
| 248 | Are you pregnant? | 4 | |
| 249 | ***[Is the patient at or below 300% of FPL?] | 4 | Badger Care Plus |
| 250 | Are you the primary care giver for a child under the age of 18? | 4 | |
| 251 | Have you been in foster care? | 4 | Badger Care Plus |
| 252 | Are you under the age of 21? | 4 | |
| 253 | Will you turn 18 on or after Jan 1, 2008? | 4 | |
| 254 | ***[Is the patient at or below 200% of FPL?] | 4 | Badger Care Plus |
| 255 | Are you a member of a farm family or a self-employed family? | 4 | Badger Care Plus |
| 256 | Are you the parent of a child in foster care? | 4 | |
| 257 | Is the patient a woman? | 4 | |
| 258 | ***[Is the patient between the ages of 45 and 64?] | 4 | |
| 259 | ***[Is the patient at or below 250% of FPL?] | 4 | |
| 260 | Are you here for a mammogram, pap test, multiple sclerosis test or other test concerning women's health? | 4 | Wisconsin Well Women Program |
| 261 | Have you lived in Milwaukee County for the last 180 days? | 4 | |
| 262 | ***[Is the patient at or below 104% of FPL?] | 4 | |
| 263 | Is the patient not eligible for any other funding sources? | 4 | GAMP |
| 264 | Are you a resident of Arkansas? | 4 | |
| 265 | ***[Is the patient at or below 33%FPL?] | 4 | |
| 266 | ***[Is the patient at or below 133% FPL?] | 4 | |
| 267 | Is the patient under 6 years of age? | 4 | AR Kids First A |
| 268 | ***[Is the patient at or below 100% of FPL?] | 4 | |
| 269 | Is the patient between 6 and 19 years of age? | 4 | AR Kids First A |
| 270 | ***[Is the patient at or below 200% of FPL?] | 4 | |
| 271 | ***[Is the patient under 20 years of age?] | 4 | |
| 272 | Has the child been uninsured for less than 6 months? | 4 | AR Kids First B |
| 273 | Is there no employer sponsored health insurance available for the child? | 4 | AR Kids First B |
| 274 | Was there an involuntary loss of insurance? | 4 | AR Kids First B |
| 275 | Is the patient a woman? | 4 | |

*Fig. 1A (cont.)*

| | | | |
|---|---|---|---|
| 276 | Are you not eligible for any other Arkansas Medicaid programs? | 4 | AR Women's Health |
| 277 | Do you have tuberculosis or does the doctor suspect that you might have tuberculosis? | 4 | AR TB Program |
| 278 | Are you not eligible for other Medicaid programs in ANY category? | 4 | |
| 279 | ***[Is the patient between the ages of 19 and 64?] | 4 | AR HIFA Waiver |
| 280 | Is the patient curently employed? | 4 | |
| 281 | Are you a resident of Missouri? | 4 | |
| 282 | ***[Is the patient under 1 year of age?] | 4 | |
| 283 | ***[Is the patient at or below 185% of FPL?] | 4 | |
| 284 | Does the patient have or intend to apply for a Social Security Number? | 4 | MO HealthNet for Kids Non-SCHIP |
| 285 | ***[Is the patient between 1 and 5 years of age?] | 4 | |
| 286 | ***[Is the patient at or below 133% of FPL?] | 4 | |
| 287 | Does the patient have or intend to apply for a Social Security Number? | 4 | MO HealthNet for Kids Non-SCHIP |
| 288 | ***[Is the patient between 6 and 18 years of age?] | 4 | |
| 289 | ***[Is the patient at or below 100% of FPL?] | 4 | |
| 290 | Does the patient have or intend to apply for a Social Security Number? | 4 | MO HealthNet for Kids Non-SCHIP |
| 291 | ***[Is the patient under 19 years of age?] | 4 | |
| 292 | ***[Is the patient between 150-300% of FPL?] | 4 | |
| 293 | Does the patient have or intend to apply for a Social Security Number? | 4 | |
| 294 | Have you been uninsured for 6 months or longer? | 4 | |
| 295 | Do you not have access to affordable healthcare? ($64-161/month) | 4 | |
| 296 | Is the net worth of the family's assets worth less than $250,000? | 4 | MO HealthNet for Kids SCHIP |
| 297 | Are you able to verify that you're pregnant? | 4 | |
| 298 | ***[Is the patient at or below 185% of FPL? (NOTE: IN THE ABILITY TO PAY TIER, UN-BORN BABY IS TO BE COUNTED AS A FAMILY MEMBER)] | 4 | |
| 299 | Do you have or are you intending to apply for a Social Security Number? | 4 | MO HealthNet for Pregnant Women and Newborns |
| 300 | Are you a resident of Kansas? | 4 | |
| 301 | ***[Is the patient less than 1 year of age?] | 4 | KS HealthWave |
| 302 | ***[Is the patient at or below 150% of FPL?] | 4 | KS HealthWave |
| 303 | ***[Is the patient less than 1 year of age?] | 4 | |
| 304 | Are you pregnant? | 4 | |
| 305 | ***[Is the patient at or below 37% of FPL?] | 4 | KS HealthWave |
| 306 | Are you the parent of a child that qualifies for HealthWave or HealthWave-SCHIP? | 4 | |
| 307 | ***[Is the patient at or below 100% of FPL?] | 4 | |
| 308 | Are you the parent of a child that qualifies for HealthWave or HealthWave-SCHIP? | 4 | KS HealthWave PAE |
| 309 | Are you a resident of Massachusetts? | 4 | |
| 310 | ***[Is the patient below 100% of FPL?] | 4 | |
| 311 | Are you unemployeed? | 4 | MassHealth |
| 312 | ***[Is the patient at or below 133% of FPL?] | 4 | |
| 313 | Are you the parent or caretaker of a person under the age of 19? | 4 | |
| 314 | ***[Is the patient at or below 150% of FPL?] | 4 | MassHealth |

*Fig. 1A (cont.)*

| # | Question | | Program |
|---|---|---|---|
| 315 | Is the patient 18 years of age or younger? | ▲ | |
| 316 | Is the patient an uninsured adult? | ▲ | MassHealth |
| 317 | ***[Is the patient at or below 300% of FPL?] | ▲ | Commonwealth Care |
| 318 | Is the patient a pregnant woman? | ▲ | MassHealth |
| 319 | Is the patient under one year of age? | ▲ | MassHealth |
| 320 | Are you H.I.V. positive? | ▲ | MassHealth Family Assistance |
| 321 | Are you a resident of Texas? | ▲ | |
| 322 | ***[Is the patient at or below 13% of FPL?] | ▲ | TX SCHIP |
| 323 | Are you a parent? | ▲ | |
| 324 | Are you currently unemployed? | ▲ | |
| 325 | ***[Is the patient at or below 27% of FPL?] | ▲ | TX SCHIP |
| 326 | Are you a parent? | ▲ | |
| 327 | Are you currently employed? | ▲ | |
| 328 | ***[Is the patient at or below 100% of FPL?] | ▲ | TX Children's Medicaid |
| 329 | Are you under the age of 18? | ▲ | TX Children's Medicaid |
| 330 | Are you any adult living with an uninsured child who provides care for them? | ▲ | |
| 331 | ***[Is the patient at or below 200% of FPL?] | ▲ | TX CHIP |
| 332 | Are you under the age of 18? | ▲ | TX CHIP |
| 333 | Are you any adult, living with an uninsured child, who provides care for them? | ▲ | |
| 334 | ***[Is the patient at or below 185% of FPL?] | ▲ | TX MBCC |
| 335 | Are you pregnant? | ▲ | TX MBCC |
| 336 | Are you receiving treatment related to family planning? | ▲ | |
| 337 | Are you a resident of Arizona? | ▲ | |
| 338 | ***[Is the patient at or below 78% of FPL?] | ▲ | SSI CASH |
| 339 | Are you 65 or older, blind or disabled? | ▲ | S.O.B.R.A. |
| 340 | ***[Is the patient at or below 100% of the FPL?] | ▲ | |
| 341 | Is the patient between the ages of 16 and 19? | ▲ | AHCCS for Families with Children |
| 342 | Is the patient apart of a family with children that have been deprived of parental support due to absence, death, disability, unemployment or underemployment? | ▲ | |
| 343 | Is the patient ineligible for any other categorical Medicaid coverage? | ▲ | AHCCS Care (AC) |
| 344 | Is the patient entitled to Medicare Part A? | ▲ | QMB |
| 345 | ***[Is the patient between 100% and 120% of FPL?] | ▲ | |
| 346 | Is the patient entitled to Medicare Part A? | ▲ | |
| 347 | Is the patient not receiving Medicaid benefits? | ▲ | SLMB |
| 348 | ***[Is the patient between 121 and 135% of FPL?] | ▲ | |
| 349 | Is the patient entitled to Medicare Part A? | ▲ | |
| 350 | Is the patient not receiving Medicaid benefits? | ▲ | QI - 1 |
| 351 | ***[Is the patient at or below 133% of FPL?] | ▲ | |
| 352 | Is the patient between the ages of 1 and 5? | ▲ | |
| 353 | Is the patient ineligible for any other categorical Medicaid coverage? | ▲ | S.O.B.R.A. |
| 354 | ***[Is the patient at or below 140% of FPL?] | ▲ | S.O.B.R.A. |
| 355 | Is the patient 1 year of age or younger? | ▲ | |
| 356 | ***[Is the patien at or below 200% of FPL?] | ▲ | |

*Fig. 1A (cont.)*

| # | Question | | Program |
|---|---|---|---|
| 357 | Is the patient working and either disabled or blind? | ◄ | Freedom to Work |
| 358 | Is the patient between the age of 16 and 64? | ◄ | |
| 359 | ***[Is the patient at or below 40% of FPL?] | ◄ | Medical Expense Deduction (MED) |
| 360 | Is the patient not eligible for Medicaid? | | |
| 361 | ***[Is the patient at or below 200% of FPL?] | ◄ | KidsCare Children Under Age 19 |
| 362 | Is the patient under the age of 19? | ◄ | |
| 363 | Is the patient under the age of 19? | ◄ | |
| 364 | Has the patient not had insurance coverage within the last 3 months? | ◄ | |
| 365 | Is the patient, their children or spouses not a state employee? | ◄ | |
| 366 | Is the patient a parent living with a child who is eligible under S.O.B.R.A. or KidsCare? | ◄ | AZ Health Insurance for Parents |
| 367 | Have you not had access to insurance coverage within the last 3 months? | ◄ | |
| 368 | Are you, your children, or your spouse NOT a state employee? | ◄ | |
| 369 | ***[Is the patient at or below 202% of FPL?] | ◄ | S.O.B.R.A. Pregnant |
| 370 | Are you pregnant? | ◄ | |
| 371 | ***[Is the patient at or below 233% of FPL?] | ◄ | Long Term Care |
| 372 | Do you require nursing home level of care or equivalent? | ◄ | |
| 373 | ***[Is the patient female?] | ◄ | |
| 374 | ***[Is the patient under the age of 16?] | ◄ | |
| 375 | Have you been screened and diagnosed with breast cancer, cervical cancer, or a pre-cancerous cervical lesion by the Well Woman Healthcheck Program? | ◄ | AZ - Breast & Cervical Cancer Treatment Program |
| 376 | Is the patient ineligible for any other categorical Medicaid coverage? | ◄ | |
| 377 | Were you referred to WeCare by a physician, Escambia County Community Clinic, St. Joseph Clinic, or Health& Hope Clinic? | ◄ | WeCare |
| 378 | Do you currently have a WeCare voucher for the services you are coming in for? | ◄ | |
| 379 | Have you come to the hospital for this visit through means other than the Emergency Room? | ◄ | HCRA Sacred Heart |
| 380 | ***[Is the patient at or below 100% of FPL?] | ◄ | HCRA Destin |
| 381 | Do you live in a county in FL that is NOT Escambia county? | ◄ | |
| 382 | Do you live in a county in FL that is not Walton county? | ◄ | |
| 383 | Are you a CA Resident? | ◄ | MediCal |
| 384 | ***[Is the patient at or below 200% of FPL?] | ◄ | |
| 385 | Is the patient less than one year old? | ◄ | |
| 386 | ***[Is the patient a female?] | ◄ | MediCal |
| 387 | ***[Is the patient aged 18 to 64 years?] | ◄ | |
| 388 | Are you pregnant or have you been pregnant within the past 90 days? | ◄ | |
| 389 | Is the patient a TX resident (or became a legal TX resident on or after August 26th, 1996)? | ◄ | |
| 390 | ***[Is the patient female?] | ◄ | |
| 391 | ***[Is the patient aged 18 to 64?] | ◄ | |
| 392 | ***[Is the patient below 185% of FPL] | ◄ | TX Children's Medicaid |
| 393 | Is the patient pregnant or has been pregnant within 90 days prior to the date of service? | ◄ | TX Children's Medicaid |
| 394 | Is the patient between the ages of 0 and 1? | ◄ | |
| 395 | ***[Is the patient between the ages of 1 and 5?] | ◄ | |
| 396 | ***[Is the patient below 133% of FPL?] | ◄ | |

*Fig. 1A (cont.)*

| # | Question | | Program |
|---|---|---|---|
| 397 | Is the patient's household below the asset limit ($3000 for household of 2, plus $100 for each additional household member)? | | |
| 398 | ***[Is the patient between the ages of 6 and 19?] | 4 | TX CHIP |
| 399 | ***[Is the patient below 100% of FPL?] | 4 | |
| 400 | Is the patient's household within the asset limit ($3000 for a household of 2, plus $100 for each additional household member)? | | |
| 401 | Is the patient the caretaker of a minor child (biological child, legally adopted, grandchild with legal guardianship, or foster child)? | 4 | TX CHIP |
| 402 | ***[Is the patient below 185% of FPL?] | 4 | |
| 403 | Is the patient a single parent of a child less then 18 years of age or a child in high school? | 4 | TX Medicaid |
| 404 | Is the patient a married legal guardian of a child less than 18 years of age or a child in high school? | 4 | |
| 405 | Are you the primary wage earner but unable to return to work or medically disabled and unable to care for your child for the next 30 days? | 4 | TX Medicaid |
| 406 | Are you the primary wage earner and making less than minimum wage and employed for less than 30 hours per week? | | TX Medicaid |
| 407 | ***[Is the patient at or below 200% FPL?] | 4 | |
| 408 | Are you currently diagnosed with breast or cervical cancer? | 4 | TX MBCC |
| 409 | ***[Are you above 200% FPL?] | 4 | |
| 410 | Are you under the age of 19? | 4 | FL Medicaid SOC |
| 411 | ***[Are you below 200% of FPL]? | 4 | |
| 412 | Are you under the age of 19? | 4 | FL Medicaid |
| 413 | Are you between the ages of 18 and 21 and living with your parents or a legal custodian? | 4 | |
| 414 | ***[Are you below 100% FPL]? | 4 | FL Medicaid |
| 415 | Are your total assets (Bank accounts, 401k, IRA, etc.) less than $2,000 (include parent assets)? | 4 | |
| 416 | ***[Are you above 100% FPL]? | 4 | FL Medicaid SOC |
| 417 | Are you below the asset limit? (Bank accounts, 401k, IRA, etc. totaling less than $2000/family) | 4 | |
| 418 | ***[Are you a female aged 18 to 65]? | 4 | FL Medicaid |
| 419 | ***[Are you a female aged 18 to 65]? | 4 | FL Medicaid |
| 420 | ***[Are you below 185% of FPL]? | 4 | |
| 421 | Are you pregnant or is treatment related to a pregnancy? | 4 | FL Medicaid SOC |
| 422 | ***[Are you above 185% of FPL]? | 4 | |
| 423 | Are you pregnant or is treatment related to a pregnancy? | 4 | |
| 424 | Are you the parent, or legal custodian, of a child under age 18 living in your home? | 4 | FL Medicaid |
| 425 | ***[Are you below 25% FPL]? | 4 | FL Medicaid SOC |
| 426 | Are your total assets (Bank accounts, 401k, IRA, etc.) less than $2,000? | 4 | |
| 427 | Are your total assets (Bank accounts, 401k, IRA, etc.) more than $2,000 but less than $5,000? | 4 | FL Medicaid SOC |
| 428 | ***[Are you above 25% FPL]? | 4 | |
| 429 | Are your total assets (Bank accounts, 401k, IRA, etc.) less than $5,000? | 4 | |
| 430 | ***[Are you over the age of 65]? | 4 | FL Medicaid |
| 431 | ***[Are you below 95% FPL]? | 4 | |
| 432 | Are you below the asset limit? (Bank accounts, 401k, IRA, etc. totaling less than $5000/family) | 4 | FL Medicaid |
| 433 | ***[Are you above 95% FPL]? | 4 | FL Medicaid SOC |
| 434 | Are you below the asset limit? (Bank accounts, 401k, IRA, etc. totaling less than $5000/family) | 4 | |
| 435 | ***[Are you a female between the ages of 50 and 64]? | 4 | |

*Fig. 1A (cont.)*

| | | |
|---|---|---|
| 436 | ***[Are you below 200% of FPL]? | 4 |
| 437 | Are you having a women's health exam? | 4 | Mary Brogan Act - Breast & Cervical |
| | | |
| 1 | Are you currently in custody by the State Prison Dept or a County Jail? | 5 | State Prison Dept |
| 2 | Is the patient in the state prison system ? | 5 | State Prison Dept |
| 3 | Were you a victim of a violent crime? | 5 | Crime victim |
| 4 | Were you a victim of a violent crime? | 5 | |
| 5 | Have you filed or do you plan on filing a police report? | 5 | |
| 6 | Was the patient born in a country other then the US? (Where were you born? Indicate country of birth on application.) | 5 | WI Crime Victim |
| 7 | Is the patient receiving Emergency treatment? [Sect 1011] | 5 | |
| 8 | Is the SSN invalid or does the patient NOT have a SSN? [Sect 1011] | 5 | |
| 9 | Has the patient volunteered that they are in the US illegally? (Indicate country of birth on application.) | 5 | Section 1011 |
| | | |
| 1 | What is the Age of the Patient? | 6 | |
| 2 | What is the patient's education level? | 6 | |
| 3 | Do you have any health-related work restrictions? | 6 | |
| 4 | Has a doctor deemed you disabled? | 6 | |
| 5 | Have you ever applied for Disability (SSI/SSD)? | 6 | |
| 6 | Are you currently in the process of applying for Disability (SSI/SSD)? | 6 | |
| 7 | Are you currently being represented by an attorney? | 6 | Medicaid for Disability, Medicare for Disability |
| 8 | How many times have you stayed overnight at a hospital in the past 12 months? | 6 | |
| | | |
| 1 | You may qualify for (Partial) Financial Assistance. Do you want to Apply? | 7 | Charity Care |

*Fig. 1A (cont.)*

PFA Funding Sources

| FundingSources | Tier | Order by Payment Yield |
|---|---|---|
| Auto Insurance | 1 | 1 |
| Worker compensation | 1 | 2 |
| Public Liability Insurance | 1 | 3 |
| WI Crime | 1 | 4 |
| WI Public and Private Liability | 1 | 5 |
| WI Worker's Compensation | 1 | 6 |
| WI Auto Insurance Liability | 1 | 7 |
| WI Pending Auto Insurance | 1 | 8 |
| Uninsured Auto | 1 | 9 |
| Crime victim | 1 | 10 |
| FL AutoWorkComp | 1 | 11 |
| Liability Upgrade (MVA, Work Comp) | 1 | 12 |
| COBRA | 2 | 1 |
| Hidden Insurance | 2 | 2 |
| Parental Coverage | 2 | 3 |
| Military | 2 | 4 |
| NH Parental Insurance Law | 2 | 5 |
| Indian Health Services | 2 | 6 |
| Student Coverage | 2 | 7 |
| WI Parental Coverage | 2 | 8 |
| Foreign Citizen | 2 | 9 |
| Pure Self Pay | 3 | 1 |
| MA Self Pay | 3 | 2 |
| Charity Pending | 3 | 3 |
| Unscreened | 3 | 4 |
| Medicaid Baby Add | 4 | 1 |
| WI State Medicaid | 4 | 2 |
| MI Childrens Medicaid | 4 | 3 |
| MI Childrens Medicaid | 4 | 4 |
| MI Family Medicaid | 4 | 5 |
| VT Medicaid | 4 | 6 |
| Dr Dynasaur | 4 | 7 |
| NH Medicaid | 4 | 8 |
| NH Healthy Kids Medicaid | 4 | 9 |
| HF Medicaid | 4 | 10 |
| ABW | 4 | 11 |

*Fig. 1B*

| | | |
|---|---|---|
| Medicare by income and age | 4 | 12 |
| Section 1011 | 4 | 13 |
| Medicaid Spend Down | 4 | 14 |
| Pending Medicaid | 4 | 15 |
| BCCT | 4 | 16 |
| VT Medicaid - Transitional Youth | 4 | 17 |
| VHAP | 4 | 18 |
| Catamount Health | 4 | 19 |
| NH Medicaid Spenddown | 4 | 20 |
| IL Medicaid | 4 | 21 |
| IL Childrens Medicaid | 4 | 22 |
| Badger Care CORE Program | 4 | 23 |
| TN Medicaid | 4 | 24 |
| TN Emergency Medicaid | 4 | 25 |
| KY Medicaid | 4 | 26 |
| TN | 4 | 27 |
| DC Alliance | 4 | 28 |
| DC Emergency Medicaid | 4 | 29 |
| MCHP | 4 | 30 |
| MD Emergency Medicaid | 4 | 31 |
| VT Medicaid Spenddown | 4 | 32 |
| Hoosier Healthwise | 4 | 33 |
| Hoosier Healthwise Spend Down | 4 | 34 |
| Indiana BCCP | 4 | 35 |
| Ladies First | 4 | 36 |
| All Kids | 4 | 37 |
| AL Medicaid | 4 | 38 |
| AL BCCP | 4 | 39 |
| MLIF | 4 | 40 |
| Out of State Pending Medicaid | 4 | 41 |
| FL Pregnancy Medicaid | 4 | 42 |
| FL Medicaid | 4 | 43 |
| GA Medicaid | 4 | 44 |
| FL Medicaid SOC | 4 | 45 |
| FL Medicaid SOC | 4 | 46 |
| GA RSM | 4 | 47 |
| Peach Care | 4 | 48 |
| TX County Program | 4 | 49 |
| GA BBC | 4 | 50 |
| FL Healthy Kids | 4 | 51 |

| | | |
|---|---|---|
| FL Children's Medicaid | 4 | 52 |
| MediKids | 4 | 53 |
| HIP | 4 | 54 |
| Badger Care Plus | 4 | 55 |
| Wisconsin Well Women Program | 4 | 56 |
| GAMP | 4 | 57 |
| AR Kids | 4 | 58 |
| AR Kids First A | 4 | 59 |
| AR Kids First B | 4 | 60 |
| AR Medicaid | 4 | 61 |
| Out of State Medicaid | 4 | 62 |
| MA State Medicaid | 4 | 63 |
| AR Women's Health | 4 | 64 |
| AR TB Program | 4 | 65 |
| AR HIFA Waiver | 4 | 66 |
| MO HealthNet for Kids Non-SCHIP | 4 | 67 |
| MO HealthNet for Kids SCHIP | 4 | 68 |
| MO HealthNet for Pregnant Women and Newborns | 4 | 69 |
| KS HealthWave | 4 | 70 |
| KS HealthWave SCHIP | 4 | 71 |
| KS HealthWave PAE | 4 | 72 |
| MA SCHIP | 4 | 73 |
| MassHealth | 4 | 74 |
| MassHealth Family Assistance | 4 | 75 |
| MA FPHP | 4 | 76 |
| MA MSP | 4 | 77 |
| MO State Medicaid | 4 | 78 |
| Commonwealth Care | 4 | 79 |
| Commonwealth Choice | 4 | 80 |
| TX SCHIP | 4 | 81 |
| TX MBCC | 4 | 82 |
| TX Children's Medicaid | 4 | 83 |
| TX CHIP | 4 | 84 |
| TX Medicaid | 4 | 85 |
| S.O.B.R.A | 4 | 86 |
| AZ Health Insurance for Parents | 4 | 87 |
| AHCCS for Families with Children | 4 | 88 |
| AHCCS Care (AC) | 4 | 89 |
| KidsCare Children Under Age 19 | 4 | 90 |
| Medical Expense Deduction (MED) | 4 | 91 |
| S.O.B.R.A. Pregnant | 4 | 92 |

| | | |
|---|---|---|
| AZ - Breast & Cervical Cancer Treatment Program | 4 | 93 |
| SSI CASH | 4 | 94 |
| SSI MAO | 4 | 95 |
| Freedom to Work | 4 | 96 |
| QMB | 4 | 97 |
| SLMB | 4 | 98 |
| QI - 1 | 4 | 99 |
| Long Term Care | 4 | 100 |
| HCRA Sacred Heart | 4 | 101 |
| HCRA Destin | 4 | 102 |
| WeCare | 4 | 103 |
| MediCal | 4 | 104 |
| Mary Brogan Act - Breast & Cervical | 4 | 105 |
| WI Crime Victim | 5 | 1 |
| Foreign Travelers | 5 | 2 |
| State Prison Dept | 5 | 3 |
| CARDON Follow Up | 5 | 4 |
| RCA Follow Up | 5 | 5 |
| HAC Follow Up | 5 | 6 |
| FIMED Follow Up | 5 | 7 |
| Generic Funding Source | 5 | 8 |
| HF Disability Medicaid | 6 | 1 |
| Medicaid for Disability | 6 | 2 |
| Medicare for SSI Disability | 6 | 3 |
| Federal Disability | 6 | 4 |
| Medicare for Disability | 6 | 5 |
| HF Charity | 7 | 1 |
| Partial Charity | 7 | 2 |
| Full Charity | 7 | 3 |
| Charity care | 7 | 4 |

*Fig. 1B (cont.)*

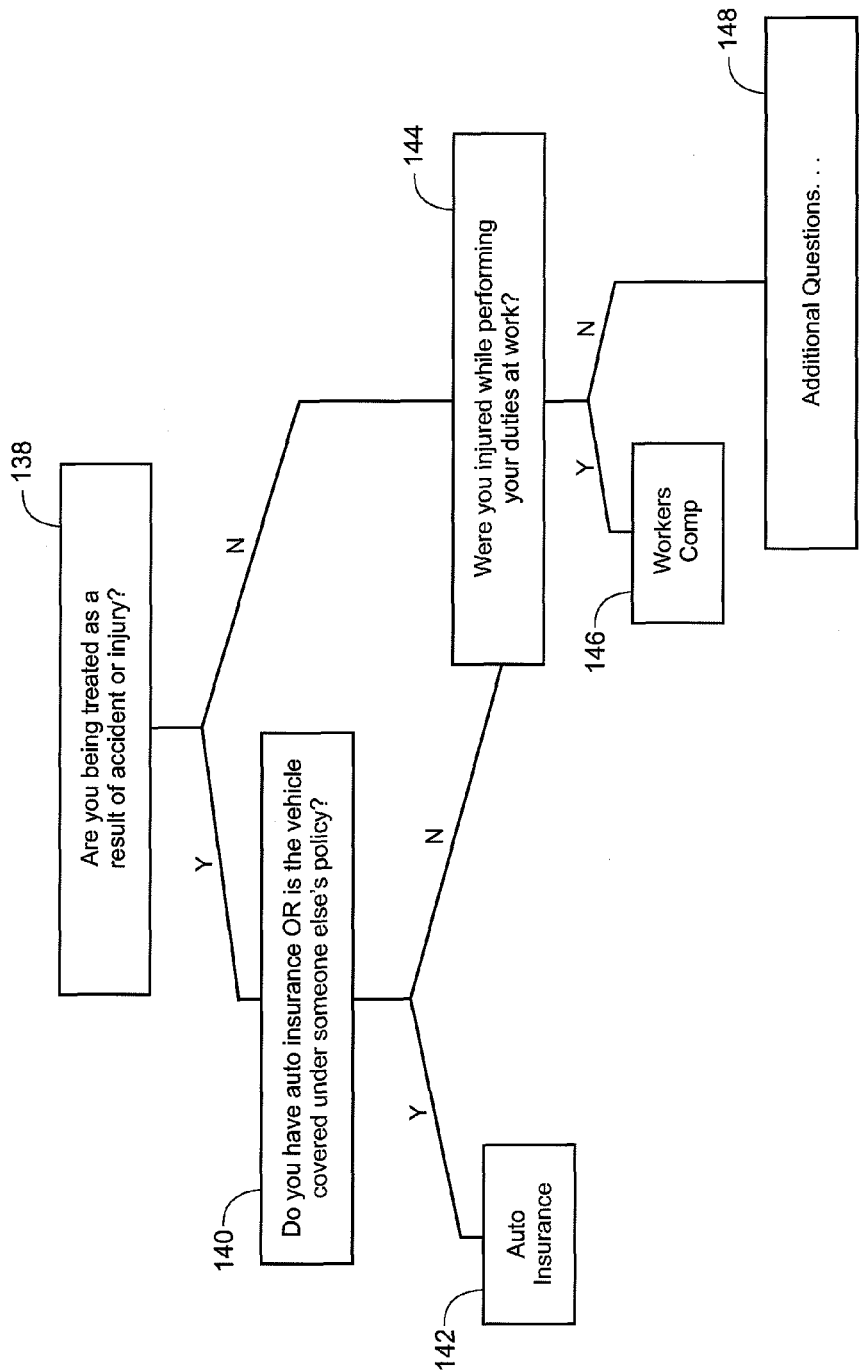

PATIENT FINANCIAL ADVOCACY SYSTEM

COMPUTER APPENDIX

This application includes a Computer Listing Appendix on compact disc, hereby incorporated by reference.

BACKGROUND OF THE INVENTION

1. Field of the Invention

The present invention relates to a patient financial advocacy system and more particularly to a system for identifying potential funding sources for uninsured patients and for the patient portion of healthcare debts that are covered by managed healthcare plans by automating the identification of potential funding sources and automating the collection of data required by such potential funding sources.

2. Description of the Prior Art

Various systems are known for automating the collection of healthcare debts. Such healthcare debts fall into one of two categories, namely debts covered by managed healthcare plans and debts incurred by uninsured patients. Examples of such automated systems for accounts receivable management for debts covered by managed healthcare plans are disclosed in US Patent Application Publication Nos. US 2008/0208640 A1; US 2008/0103826 A1; and US 2008/0189202 A1, hereby incorporated by reference.

Although such automated accounts receivable management systems for managing healthcare receivables that are covered by managed healthcare plans are quite useful, such systems are not useful in managing healthcare debts patients which are not covered by managed healthcare plans and for the patient portion of the healthcare debt. Various methods are known in the art for predicting the payment behavior of various categories of debtors in categories other than health care. Examples of such methods are disclosed in US Patent Application Nos.: US 2003/0212618 A1; US 2005/0197954 A1; US 2006/0287947 A1; US 2007/0208640 A1 and US 2007/0219885 A1, all hereby incorporated by reference. Because of different factors facing the healthcare industry, known payment behavior modeling techniques are generally not applicable to the healthcare industry. For example, healthcare providers, such as a hospital, or other acute or emergency care facility, are required by law to provide certain medical services irrespective of a patient's ability to pay under certain conditions. As such, statistical methods for payment of debtors other than healthcare providers are generally not applicable.

Commonly-owned and co-pending U.S. patent application Ser. No. 12/194,721, filed Aug. 20, 2008, entitled "Healthcare Predictive Payment Method" and US Patent Application Publication Nos. US 2008/0208640 A1 disclose the use of statistical models to predict the patient payment behavior for medical debts not covered by managed healthcare plans. Such systems are only useful for predicting the payment behavior of individual patients. Unfortunately, such systems, as described above, are unable to automatically identify funding sources and collect the necessary data required for patient healthcare debts not covered by managed healthcare plans and for the patient portion of healthcare debts covered by managed healthcare plans.

Various systems have been developed for self-pay healthcare debts. Examples of such systems are disclosed in US Patent Nos.: US 2006/0190334 A1; US 2006/0198336 A1; US 2008/0189202; and US 2009/0299764 A1. None of the systems disclosed in the aforementioned published US patent applications disclose a proactive system that provides automated system for identifying potential funding for healthcare debts of self pay patients, pursuing the funding and measuring the success of such activities as in the Patient Advocacy System. Rather, the patent applications mentioned above relate to reactive systems. More particularly, the '334 and '336 applications relate to a method for automating discounts for self-pay healthcare debts. The '202 system relates to a system for categorizing and auctioning healthcare receivables. Finally, the '764 system relates to a system for creating a healthcare lien network for establishing liens on self-pay healthcare claims which relate to healthcare services for injuries for which a tort or injury claim has been filed.

Thus, there is a need for an automated system for identifying funding sources for healthcare debts in which the patient is responsible and gathering data for various known funding sources, such as Medicaid and Cobra (Consolidated Budget Reconciliation Act of 1985).

SUMMARY OF THE INVENTION

Briefly, the present invention relates to a patient financial advocacy system for identifying potential funding sources for uninsured patients and for the patient portion of healthcare debts that are covered by managed healthcare plans by automating the identification of potential funding sources and automating the collection of data required by such potential funding sources. The system is an automated system ad includes three stages, namely, a detection stage; an execution stage and a measurement stage. In the detection stage, a multi-tiered questionnaire is used during a patient interview to identify potential funding sources. In accordance with an important aspect of the invention, the questionnaire is structured to find the funding source with the highest yield. A rules engine is programmed to analyze the patient's answers to the questions and identify a potential funding source. In the execution stage, the rules engine is further programmed with specific questionnaires structured to gather all of the required data of the identified funding source. The execution stage identifies all steps required for applying for the specific funding source. In the measurement stage, the system determines the best possible yield for all identified patient funding sources.

DESCRIPTION OF THE DRAWING

These and other advantages of the present invention will be readily understood with reference to the following specification and attached drawing wherein:

FIG. 1A is a multi-tiered list of questions used to identify potential funding sources in accordance with the present invention.

FIG. 1B is an exemplary list of funding sources that are ranked from the highest yield to the lowest yield.

FIG. 7 is a tree diagram illustrating an exemplary structure of questions presented by a rules engine in accordance with one aspect of the present invention.

DETAILED DESCRIPTION

Figure 1:
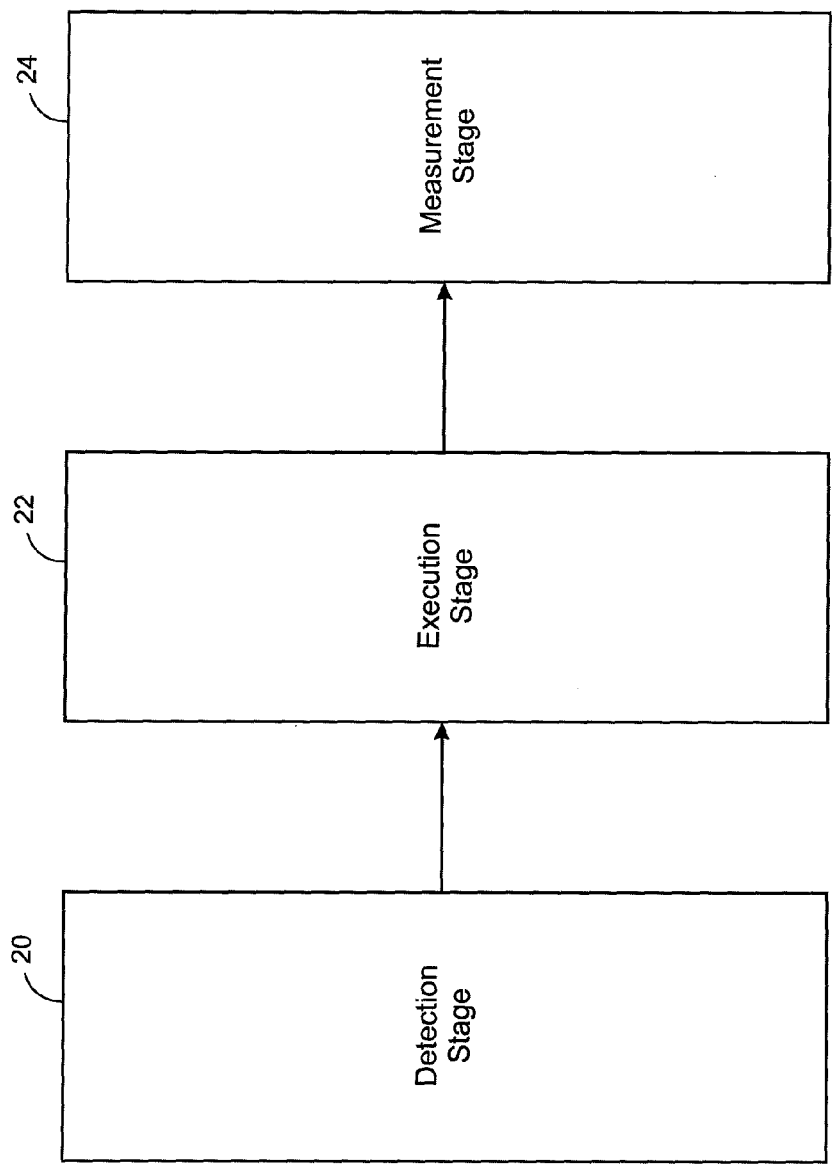
FIG. 1 illustrates an exemplary process flow diagram for a patient advocacy system in accordance with the present invention.

The present invention relates to a patient financial advocacy system for identifying potential funding sources for uninsured patients and for the patient portion of healthcare debts that are covered by managed healthcare plans (hereinafter, collectively or individually referred to as "uninsured patients") by automating the identification of potential funding sources and automating the collection of data required by such potential funding sources. The system is an automated system and, as illustrated in FIG. 1, includes three stages, namely, a detection stage 20; an execution stage 22 and a measurement stage 24.

In the detection stage 20, a multi-tiered standardized questionnaire, for example, as illustrated in FIG. 1A, is used during a patient interview to identify potential funding sources. In accordance with an important aspect of the invention, the questionnaire is structured to find the funding source with the highest yield. Exemplary funding sources listed from the highest yield to the lowest yield are illustrated in FIG. 1B. The execution stage 22 includes a rules engine with specific questionnaires structured to gather all of the required data of such potential funding sources. The execution stage identifies all steps required for applying for the specific funding source. The measurement stage 24 determines the best possible yield for all identified patient funding sources.

Figure 2:
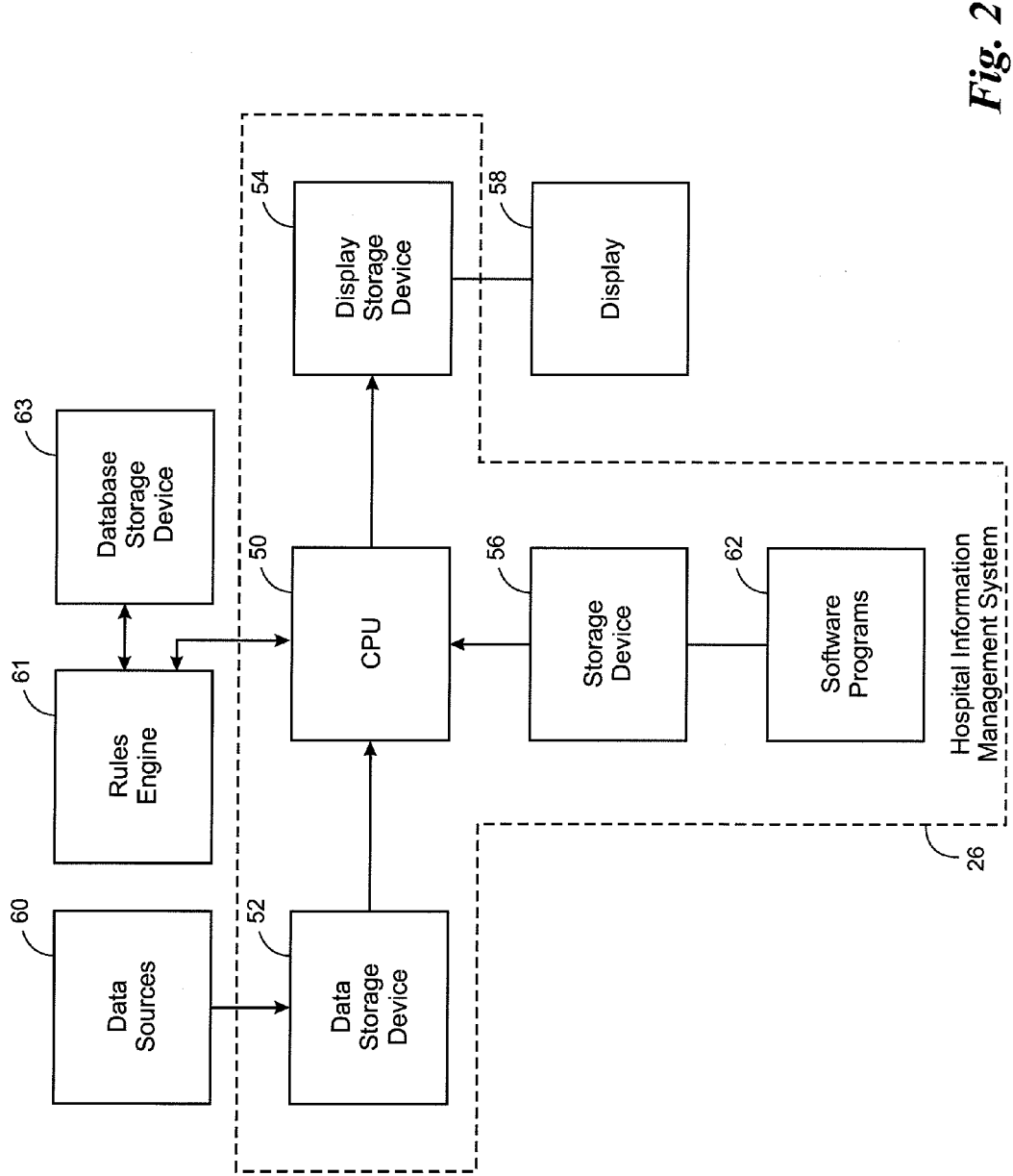
FIG. 2 is an exemplary block diagram of the system in accordance with the present invention incorporated into a healthcare information system.

An exemplary block diagram of the patient advocacy system in accordance with the present invention and how it interfaces with an exemplary hospital information management (HIM) system, generally identified with the reference numeral 26, is illustrated in FIG. 2. The HIM system 26 may be implemented by way of one or more computers or servers 50 having at least one central processing unit (CPU), memory storage devices 52, 54 and 56. The storage device 52 is a persistent storage device, such as a hard disk for flash ROM for storing various patient data. The display storage device may be a random access memory (RAM) device. A display 58 is connected to the display storage device 54 for displaying various data.

Various data sources, generally identified with the reference numeral 60, as discussed below, are stored on the persistent storage device 52. The CPU 50 is programmed by one or more application programs, generally identified with the reference numeral 62, as discussed below. The application programs including the system operating system, such as the Windows® operating system or other operating system, collectively, identified as the software programs 62, may also be stored in the persistent storage devices 56.

The CPU 50 is programmed to operate in accordance with the software programs stored on the software storage device 56. Data from the various data sources 60 is received by the CPU 50 by way of the data storage device 52. This data 60 is processed by the CPU 50 in accordance with the software programs stored on the software storage device. As will be discussed in more detail below, once the data is processed, the CPU 50 transforms the data and provides the transformed data to healthcare personnel, optionally by way of a graphical user interface (GUI).

In addition to the data sources 60, there are other inputs to the HIM system 26. These inputs include a rules engine 61 and a database storage device 63 which are hosted by one more servers remote from the HIM system 26. Both the engine 61 and a database storage device 63 are discussed in detail below. In general, the HIM System 26 interfaces with the rules engine 61 and the database storage device 63 to automatically identify potential funding sources and automate collection from such funding sources for uninsured patients.

Figure 3:
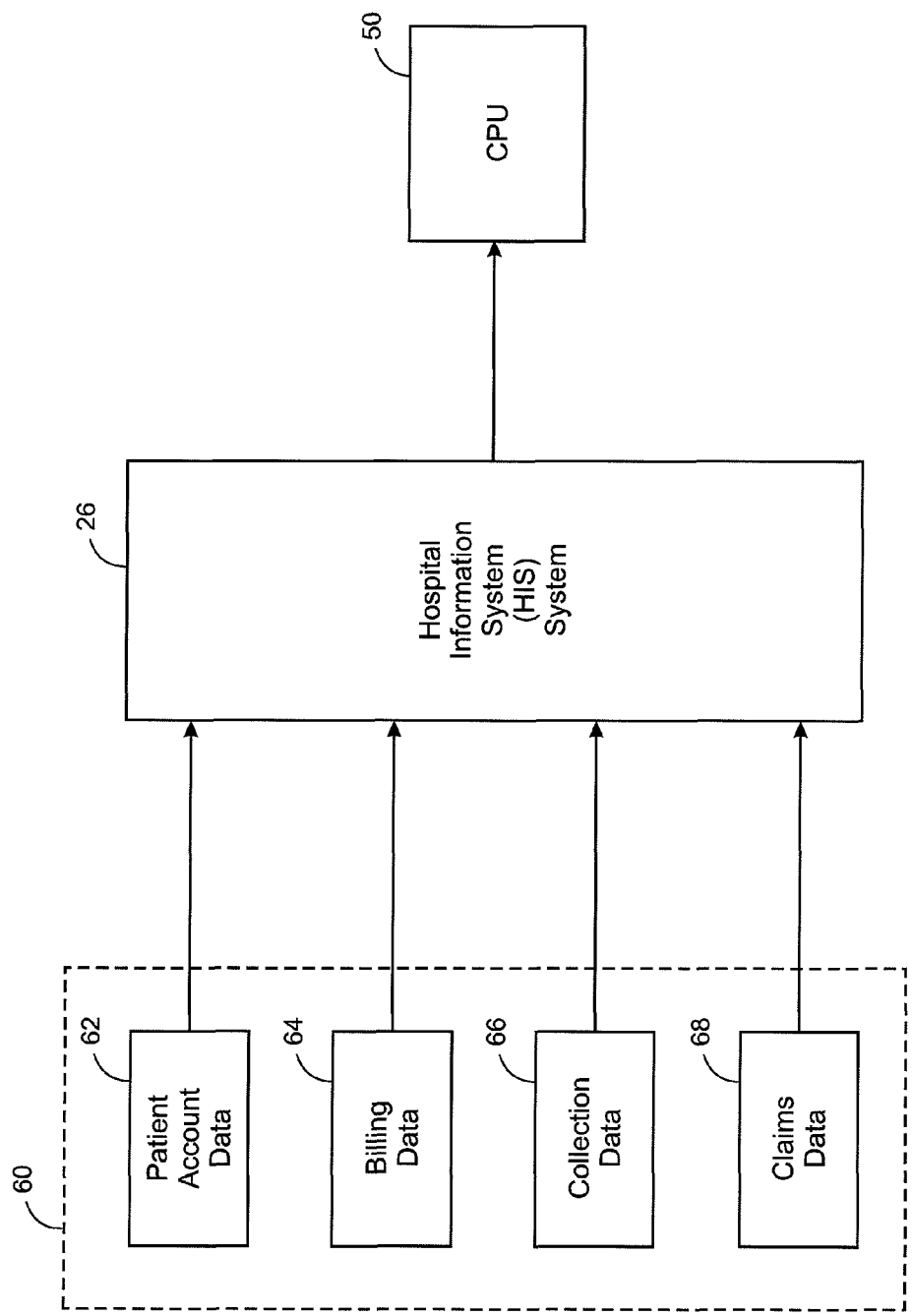
FIG. 3 is a block diagram illustrating various data sources that are supplied to the healthcare information system present invention.

FIG. 3 illustrates the various data sources within the dashed box, identified within the dashed box 60. These data sources include patient account data 62, billing data 64 and collection data 66. Patient account data is normally accumulated by a healthcare facility's "front office" during the first stage of the patient account revenue cycle. Billing data is normally accumulated by a healthcare's "middle office" also normally during the first stage of the patient account revenue cycle. The "back office" of the healthcare facility normally creates the bill during the second stage of the patient revenue cycle sends out the bill and follows up on the bill during the third stage of the patient account revenue cycle.

More particularly, a healthcare facility's front office revenue cycle operations typically consist of scheduling, pre-registration, registration and collection of patient co-payments. Complete and accurate information gathering at this stage is critical to a hospital's ability to collect revenue from the patient and third-party payors after healthcare services are provided. Patient account data 62 identifies patient demographic information and the patient payer information. Patient account data 62 is normally obtained during the patient registration process before any healthcare services are provided to the patient. The time beginning with patient registration and ending with the date the patient is billed is the first stage of the patient revenue cycle.

During registration and/or pre-registration, the healthcare provider normally determines whether the patient's anticipated medical expenses will be covered by a third party payer, such as an insurance company. If the patient is covered by a third party payer, the patient portion of the anticipated medical expense is also determined.

Once it is determined that the patient either has no insurance, or has insurance but includes a patient payment portion, the detection stage 20 (FIG. 1) of present invention commences. As discussed above, during the detection stage 20, a multi-tiered questionnaire (FIG. 1A) is presented to the patient registrar by way of prompts on the display 58 (FIG. 2) during patient registration or pre-registration. The multi-tiered questionnaire is composed of standardized questions which may be stored in the database storage device 63. The rules engine 61 is programmed to present the standardized questions to the display 58 in a sequential order. More particularly, an exemplary list of questions is illustrated in FIG. 1B. The left-most column, identified as "Order" identifies the order that the questions are presented. The questionnaire is structured, to find the funding source with the highest yield. Most of the questions are associated with a funding source, as indicated by the column identified as "Funding Source". Thus, the question(s) associated with a particular funding source are designed to determine if the particular funding source is applicable. For example, the questions may be designed or structured so that an affirmative answer to one or more questions is an indication that the particular funding source is or may be applicable.

Some of the questions in FIG. 1B are duplicated. The questions are duplicated because separate funding sources may have overlapping criteria. The deliberate ordering of questions ensures that the question is asked only once for the highest yielding funding source. The questions are listed separately since the criteria may apply to different funding sources.

All of the questions are associated with a tier, as indicated by the column identified as "Tier". The tiers are assigned as a function of the highest expected yield and are assigned numeric integer values with tier 1 being the highest expected yield. In other words, the highest expected yield is the funding source that is expected to pay out the most money for a particular claim. The assignment of the integer values for the tiers and the order of the funding sources within the tiers is based previous experiences of a health care provider with different funding sources.

As shown, a number of funding sources may be assigned to each tier. The various funding sources within each tier are selected to be within a predetermined range of yields. The various funding sources associated within each tier may or may not be listed in the order of the highest yield to the lowest yield within the tier. For example, as illustrated in FIG. 1B, tier 1 includes the following funding sources: Auto insurance, worker's compensation, and public and private liability insurance. In the case of Tier 1, for example, the funding sources are grouped together because these funding sources have a common element; namely, they represent the funding sources normally responsible in situations in which a person is being treated as a result of an accident or injury. As such, the first question in each tier is structured to determine if a particular funding tier is applicable. For example, question 1 in Tier 1 is: "Are you being treated as a result of an accident or injury?" If the patient answers "yes", then, the patient is sequentially asked questions 2-20 in Tier 1 in order to identify a funding source.

As mentioned above, the questions may be structured so that an affirmative answer to a question identifies a funding source. Assuming an affirmative answer to Question 1 of Tier 1 (FIG. 1B), if no funding source is identified, the system proceeds to Tier 2, question 1 and the patient is asked the tier 2 questions until a funding source is identified. The process is repeated until a funding source is identified or the system or the list of tiers and questions is exhausted.

In order to determine if some funding sources are applicable, answers to more than one question may be required. For example, in order to determine if the New Hampshire Parental Insurance Law is available as a funding source, a number of questions need to be answered. Exemplary questions 12-17 in Tier 2 (FIG. 1B) may be used to determine if such a funding source is available. Other funding sources may also require answers to multiple questions in order to determine if the funding source is applicable.

If, for example, the patient provides a negative response to the first question in a tier, the rules engine 61 skips the rest of the questions in that tier and proceeds to the first question in the next tier. For example, if the patient response to question 1, tier 1 is negative, the rules engine would skip to question 1, tier 2 and so on until a positive response was provided to the question 1 in the remaining tiers or until a negative response was provided for the last tier. The rules engine 61 is further programmed to analyze the patient's answers to the questions in order to identify a potential funding source. Thus, next tier questions are only displayed whenever a funding source is not found in the current tier. This graduation insures that the highest yielding funding source will always be pursued.

The sequence is structured to identify a funding source with the highest possible yield as determined by the patient's answers to the various questions in the questionnaire. In other words, the questions in FIG. 1A are presented in order to identify funding sources with the highest yield. Exemplary funding sources are identified in FIG. 1B. These funding sources may be identified by tiers and yield. For example, Auto insurance is the highest yielding funding source in Tier 1 while Cobra is the highest yielding funding source in Tier 2. However, Medicaid questions are presented at the top of Tier 2 in FIG. 1A. The Medicaid related questions are to catch if an application is already in process from a previous screening. Other funding sources after these questions can effectively be ruled out if a Medicaid application is already in process. The Medicaid questions are not the first questions because the funding sources associated with the questions ahead of the Medicaid questions may apply to this particular visit and have higher yield even if there is a Medicaid application already in progress.

FIG. 1C identifies exemplary funding sources. The funding sources are identified by the tier to which they have been associated, as indicated by the column labeled as "Tier". The relative yield of each funding source by tier is also identified, as indicated by the column labeled "Order by Payment Yield". The order is ranked with integer values with the number 1 being the funding source with the highest yield for a particular tier. For example, referring to FIG. 1, auto insurance is identified as the funding source with the highest yield for tier 1 while COBRA is identified as the funding source with the highest yield for tier 2. As shown in FIG. 1C, seven (7) tiers are illustrated. These tiers correspond to the tiers illustrated in FIG. 1B.

The patient's answers to the funding source questions may be stored as Patient Account Data 62 (FIG. 3). Once the funding source with the highest yield is identified, the rules engine 61 is further programmed to create a set of questions structured to gather all of the required data of such potential funding sources.

Figure 4:
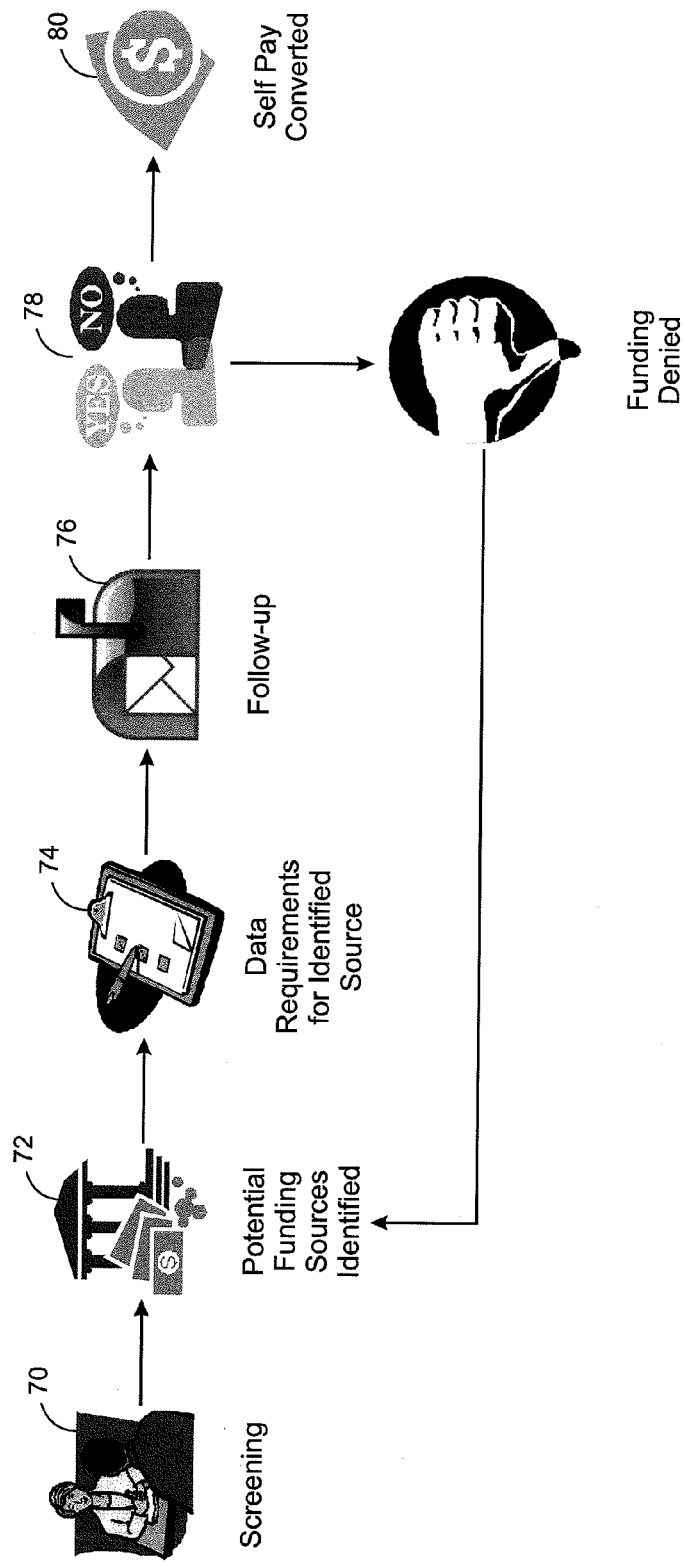
FIG. 4 is an exemplary process flow diagram for the patient advocacy system in accordance with the present invention.

FIG. 4 is an exemplary process flow diagram for the patient advocacy system in accordance with the present invention. As shown, patients are initially screened during registration and pre-registration, as indicated in step 70. As will be discussed in more detail below, in accordance with an important aspect of the invention, the screening process is standardized to ensure that relatively complete and accurate information is captured from each patient. In particular, the health care person registering or pre-registering a patient is prompted with standardized questions on the display of a personal computer or work station during the registration process. The prospective patient's answers are one component of the Data Sources 60 (FIG. 2) and are stored on the Data Storage Device 52 and processed by the CPU 50. This information forms part of the Patient Account Data 62 (FIG. 3) and is used to determine if the prospective patient is covered by a commercial and/or government insurer, such as Medicare. If the prospective patient is not covered by a commercial or government insurer, the health care person registering or pre-registering the registrar is further prompted to ask the patient questions presented on a multi-tiered questionnaire, stored in the data base storage device 63 (FIG. 2). The patient's answers to the questions on the questionnaire are stored in the data storage device 52 and processed by the CPU 50 to determine if an alternative payer is liable, as indicated in step 72 (FIG. 4). In accordance with an important aspect of the invention, in situations in which the patient is not covered by a commercial or government insurer, the multi-tiered questionnaire is configured to detect potential funding source or alternative payer with the highest yield.

After the potential funding source is identified, the system enters the execution stage 22 (FIG. 1) and prompts the person registering or pre-registering the patient with a series of questions from the Rules Engine 61 (FIG. 2) in step 74. These questions are configured to elicit all of the information required by the identified funding source. For example, if the alternative funding source is identified as third party automobile liability insurance, then the Rules Engine 61 may prompt the registrar, i.e. person registering or pre-registering the patient with a series of questions that are germane to third party automobile liability insurance. As before, the patient's answers to the specified questions are stored in the data storage device 52 and processed by the CPU 50 and used to systematically collect all of the required information from the patient for the identified funding source.

During the Execution Stage 22 (FIG. 1), the system identifies all steps that need to be taken to collect payment from the identified funding source. The steps for the various funding sources may be handled by centralized back office personnel specialized by the specific funding source. For example, Medicaid claims would be handled by centralized back office personnel specialized in processing such Medicaid claims. Alternatively, some or all of the steps in preparing and sending out claim forms may be automated by the system. For example, once a potential funding source is identified, patient data 60 can be automatically input into the form(s) required by the potential funding source as the data is being received by the system. Once the required form(s) are complete, the completed applications can be down loaded for signature and subsequent delivery to the identified funding source. For those applications in which signature are not required, the system can automatically send the completed form electronically to the identified funding source.

As indicated FIG. 4, the Execution Stage 22 (FIG. 1) also includes a follow-up step 76. In order to facilitate follow-up, the system enables the various patient records to be sorted in various ways, such as by funding source or by status of funding or other ways. By enabling the patient records to be sorted by funding source, the follow-up can be assigned to a centralized team of specialists for the identified funding source, e.g. Medicaid specialists.

Step 78(FIG. 4) of the process illustrates the outcomes of the decision process by the identified funding source. If a decision is made by the identified funding source to pay the claim, the patient records are converted from a self-pay status, as indicated in step 80, to a status which indicates that the patient account will be paid by the identified funding source. If the initial identified self funding source is denied, the system loops back to step 72, back to the detection stage 20 (FIG. 1) to determine an alternative funding source. In such an application, the patient is questioned prior to discharge in order to determine if other potential funding sources are available.

Figure 4A:
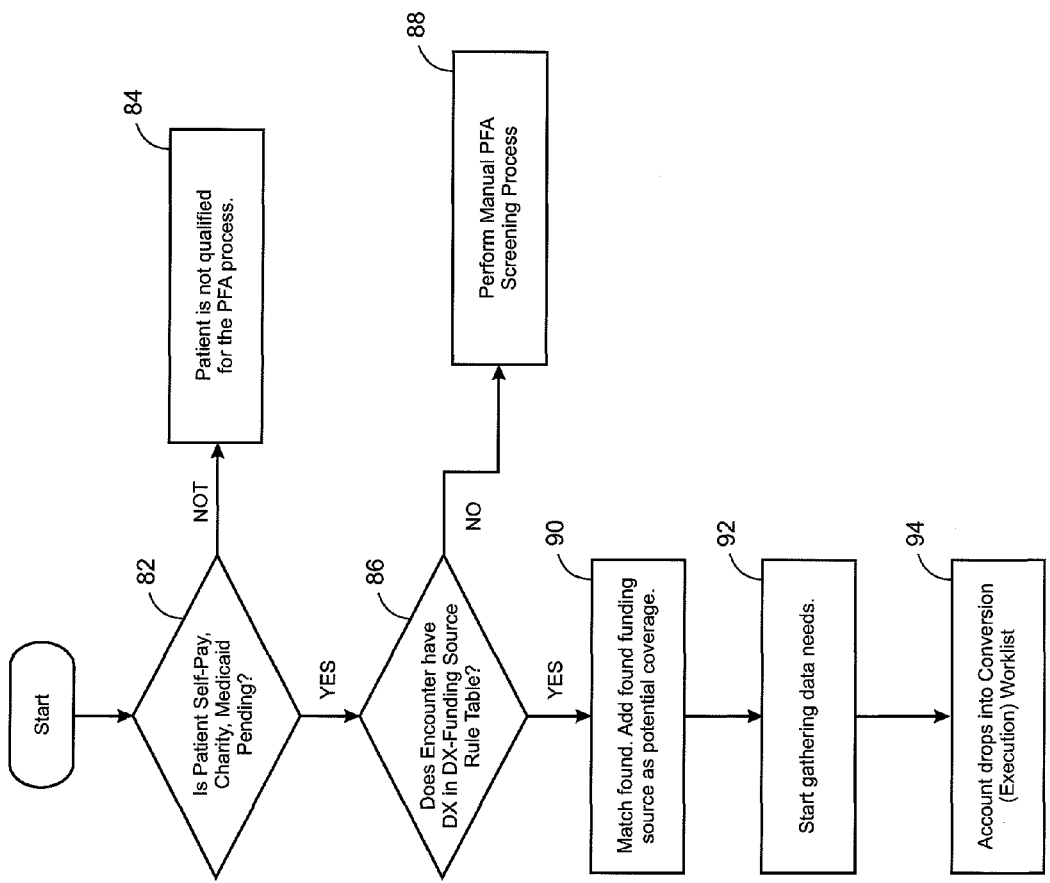
FIG. 4A is an exemplary flow diagram illustrating the detection of a potential funding source in accordance with the present invention for uninsured patients and the patient portion of healthcare expenses covered by a third party insurer.

FIG. 4A is an exemplary flow diagram illustrating the detection of a diagnosis based funding source in accordance with the present invention for uninsured patients. Initially in step 82, the system determines if the patient has been identified, for example, during the registration process, as either "self-pay", "charity" or "Medicaid pending". If not, the system determines in step 82 that the patient is not qualified for the patient advocacy system in accordance with the present invention. If the patient qualifies for the patient advocacy system as determined in step 82, the system checks for a diagnosis code in step 86, since many funding sources are dependent upon a specific diagnosis. If the diagnosis code for the patient is not listed in a list of diagnoses qualified for funding, the system proceeds to step 88 and prompts the registrar with the multi-tiered questions, as discussed above in connection with FIG. 4.

If the diagnosis is found, as indicated in step 90, the system flags that a potential funding source has been found in step 90. In step 92, the system begins gathering data for the identified funding source. This data may be collected from the patient account data 62 (FIG. 3) or by answers to questions prompted to the registrar. This data is used in the manner discussed above to automate to the extent possible depending on the funding source, the filing of a claim. In step 94, the patient is identified as having a funding source in an execution work list.

Figure 5:
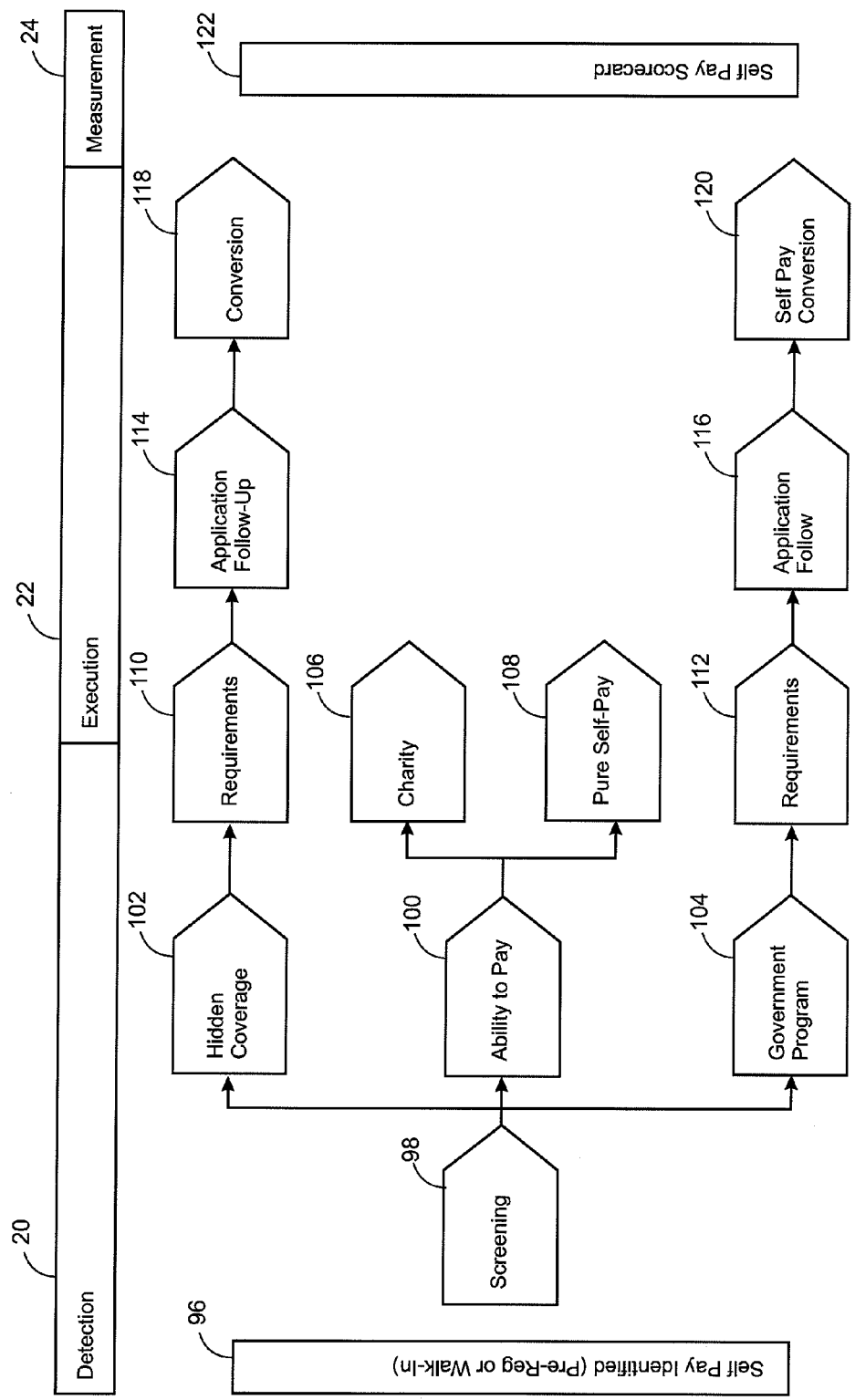
FIG. 5 is a more detailed process flow diagram of the patient financial advocacy system in accordance with the present invention.

FIG. 5 is a more detailed process flow diagram summarizing the patient financial advocacy system in accordance with the present invention. As mentioned above in connection with FIG. 1, the financial advocacy system in accordance with the present invention includes three (3) stages: a detection stage 20, an execution stage 22 and a measurement stage 24. The process is initiated in step 96 when a patient is identified as a self pay either during pre-registration or as a walk-in. During the detection phase, the patient is screened as indicated by the box 98, for example, during the registration process. The screening process is structured to determine whether the patient is able to pay, as indicated by the box 100 or whether the patient has potential hidden coverage, as indicated by the box 102 or whether the patient qualifies for a government program, as indicated by the box 104.

Once a funding source is identified, the system proceeds to the execution stage 22 (FIG. 1). If the funding source is determined to be charity or pure self pay, as indicated by the boxes 106 or 108 respectively, the system flags this information in the patient account data 62 (FIG. 3). If hidden coverage 102 or a government funding program 104 is identified as a potential funding source, the required data for the identified funding source is obtained, as indicated by the boxes 110 and 112, respectively. In either case, once the required information is obtained, a "back office" team of specialists can be used to follow up on the accounts for which a funding source has been identified, as indicated by the boxes 114 and 116. For example, Medicaid specialists can be used on all accounts in which Medicaid has been identified as the funding source. The accounts are also amended to convert the payment responsibility from self pay to the identified funding source, as indicated by the boxes 118 and 120.

The measurement stage 24 (FIG. 1) determines the best possible yield for all identified patient funding sources, as indicated by the box 122. The best possible yield may be determined in a manner as described in U.S. Pat. No. 7,672,858, hereby incorporated by reference.

Figure 6:
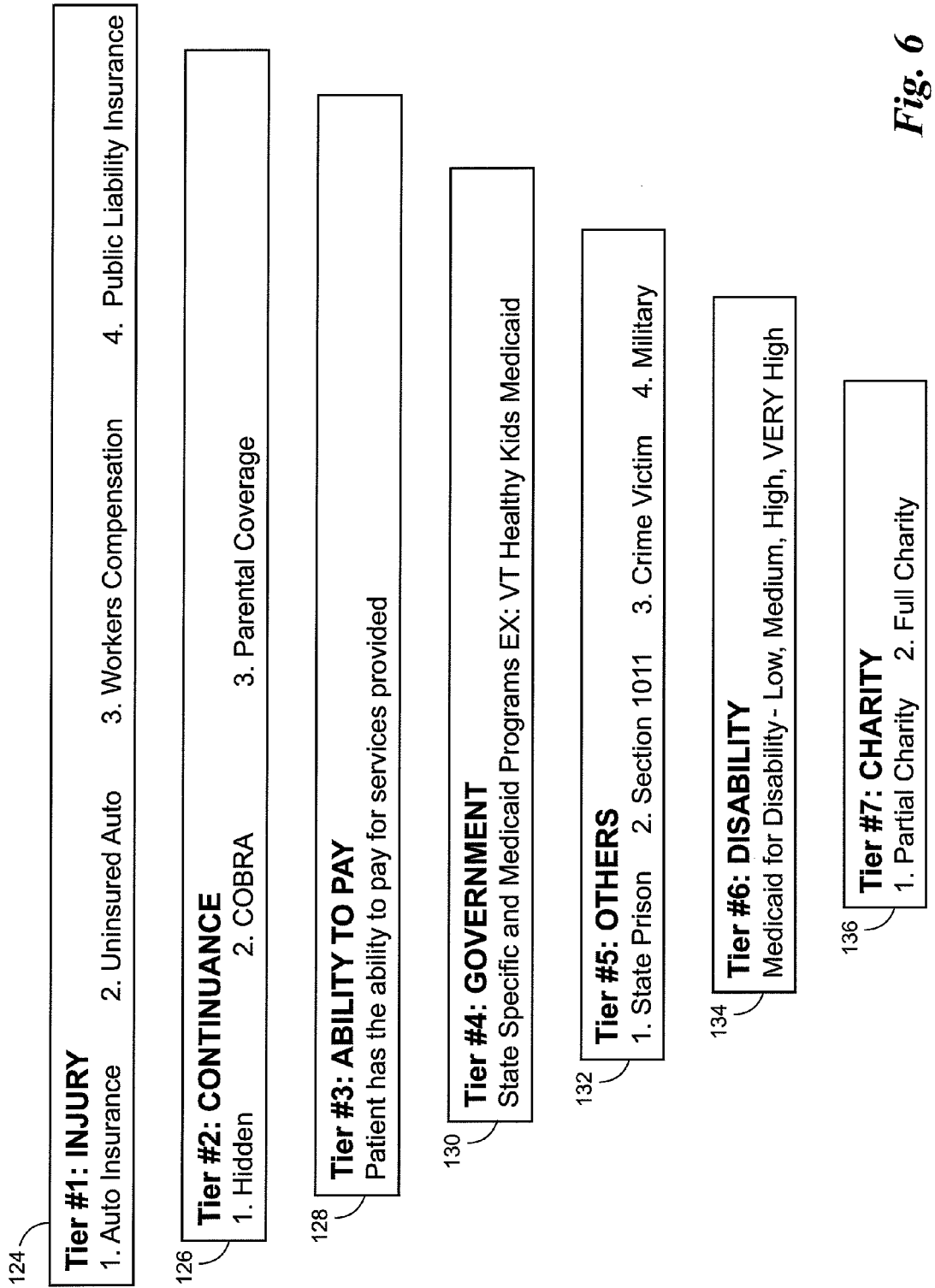
FIG. 6 is an exemplary diagram of potential funding sources for use with the patient advocacy system.

FIG. 6 illustrates an exemplary diagram of potential funding sources for use with the patient advocacy system in accordance with the present invention. The funding sources are optionally categorized in multiple tiers, for example, seven (7) tiers 124-136. In accordance with an important aspect of the invention, the tiers 124-136 are arranged according to the highest yield for payment. As such, the tiers 124-136 are arranged from the highest yield 124 to the lowest yield 136. As mentioned above, various sets of questions are associated with each tier 124-136 and stored in the database storage device 62.3 (FIG. 2). The rules engine 61, for example, a server or computer, is configured to prompt the registrar on the display 58 with questions. Questions are prompted starting with questions associated with the highest tier 124 (FIG. 6) down toward the lowest tier 136 until a potential funding source for the patient is located. Once a potential funding source is identified, the rules engine 61 secures information required for the identified funding source by obtaining any required data patient account data 60 (FIG. 3) and/or questions to the registrar by way of the display 58 to ask the patient during registration. These questions which are related to the information required by the identified funding source are presented to the patient. The answers are then stored in the data storage device 52.

In general, the questions may be organized in a tree structure, as illustrated in FIG. 7. For example, the first tier of questions may be based on whether the healthcare services were necessitated by an injury or accident, as indicated by the box 138. If so, the questions in tier 1 are structured to determine if the person is covered by auto insurance, as indicated in blocks 140 and 142. If so, the claim is filed with the auto insurer. If either the claim is not covered by auto insurance, as indicated by the block 140, or the treatment is not related to an accident or injury, as indicated in block 138, the rules engine 61 (FIG. 2) presents questions to determine if the injury was a work related injury, as indicated by the block 144. If so, a determination is made that the treatment is covered under worker's compensation, as indicated by the block 146. If it is determined that the injury was not work related, then other questions are presented, as discussed above and illustrated in FIG. 1B, as indicated by the block 148.

Referring back to FIG. 6, tier 1, identified with the reference numeral 124, relates to injury. At times, people become injured and there exists insurance that will cover their injuries. There are several potential sources of coverage for injuries, such as:
  Auto Insurance
  Workers' Compensation
  Uninsured Auto
  Public Liability.

Exemplary screening questions to identify if the potential funding source is a tier 1 funding source may include the following questions:
  Are you being treated as a result of an injury?
  Were you involved in an auto accident?
  Do you have auto insurance?
  Are you currently uninsured?
  Were you injured while performing your duties at work?
  Was the non-work related injury on private or public property?

The second tier, identified with the reference numeral 12, relates to continuance. Continuance coverage includes coverage that has not yet expired, health insurance that is still active even in different formats, and insurance that could cover the patient but that they're not currently enrolled in. Potential Sources of Coverage include:
  COBRA
  Hidden Insurance
  Parental Coverage The third tier, identified with the reference numeral 128, relates to a patient's ability to pay. This tier 128 relates to patients without health insurance who are willing and able to pay for their health care services. The source of coverage for the Ability to Pay tier is the patient themselves
  Patients may pay all at once
  Patients may also be counseled financially and aided in the set up of an appropriate payment plan This tier may also be used to calculate a patient's relationship to the Federal Poverty Level (FPL) if they are unable to pay Tier 4, identified with the reference numeral 130, relates to governmental sources of funding. There are several governmental organizations and programs that offer healthcare coverage for the uninsured. Potential sources of coverage include:
  Medicaid
  Tricare
  Alternate Benefit Waiver
  County Health Programs This tier 130 is where most state-specific funding sources reside. For example, Wisconsin state-specific funding sources include Badger Care Plus, Ozaukee County Health, etc. Michigan state specific funding sources include MI SCHIP, Michigan Medicaid, etc. As other states create state-specific funding sources, these funding sources may be added to Tier 4 assuming the yield of such funding sources is roughly equivalent with the yield of other state specific funding sources in this tier. If not, new state specific funding sources are added to the tier (higher or lower) with an equivalent yield and the questions associated with the source are located in FIG. 1A in a location commensurate with its yield.

Tier 5, identified with the reference numeral 132, relates to other sources of financing. There may be miscellaneous types of coverage available for patients. Examples of Other coverage can include private grants or specific programs that provide coverage for specific populations, for example:
  the Musicians Health Fund that helps to take of musicians without health insurance.
  Crime victims state prison inmates
  Section 1011. Section 1011 of the Medicare Modernization Act provides emergency health insurance for undocumented aliens.

Tier 6, identified with the reference numeral 134, relates to disability as a source of funding. There is coverage provided for the uninsured disabled population by the Social Security Administration of the Federal Government. The Disability Tier calculates the patient's propensity to be covered using the following factors:
  FPL level
  Number of chronic diseases
  Whether or not the patient has a terminal illness
  Education level
  Age
  Amount of time the patient has spent in the hospital Tier 7, identified with the reference numeral 136, relates to charity as a source of funding. If a patient does not qualify for any coverage in any preceding tier the PFA tool will assess their qualification for the hospital's charity program
  Based on the patient's FPL level and the hospital's policy, they will qualify for full charity coverage, partial charity coverage, or be personally responsible for their hospital bill.
  Regardless of the outcome, the hospital will work with the patient to make the solution work best for both parties.

Obviously, many modifications and variations of the present invention are possible in light of the above teachings. Thus, it is to be understood that, within the scope of the appended claims, the invention may be practiced otherwise than as specifically described above.

What is claimed and desired to be secured by a Letters Patent of the United States is:

1. A computerized patient financial advocacy system for identifying a funding source for an uninsured patient for a specific healthcare service which provides the most amount of money to a health care provider for the health care service, the system comprising:
  a computer programmed with rules defining a rules engine which generates standardized questions that are organized in a plurality of tiers including a highest tier that pays out the most amount of money to the health care provider for the health care service and a lowest tier that pays out the least amount of money to the health care provider for the health care service, each tier corresponding to one or more funding sources, said questions presented sequentially from the highest tier to the lowest tier until the funding source for the health care service is identified, said rules engine is further programmed to analyze patient responses to said standardized questions to identify the funding source that will pay out the most money to the health care provider for the health care service based upon said responses from said patient.

2. The patient advocacy system as recited in claim 1, wherein said rules engine is further programmed to provide additional questions in order to obtain information required by the identified funding source.

3. The patient advocacy system as recited in claim 1, wherein one or more of said plurality of tiers include a plurality of funding sources wherein said funding sources are organized in said tier from the potential funding sources that pays out the most amount of money to the health care provider for the health care service to the funding source that pays out the least amount of money to the health care provider for the health care service.

4. The patient advocacy system as recited in claim 1, wherein at least one tier includes hidden coverage.

5. The patient advocacy system as recited in claim 4, wherein said hidden coverage includes COBRA.

6. The patient advocacy system as recited in claim 4, wherein said hidden coverage includes parental coverage.

7. The patient advocacy system as recited in claim 1, wherein at least one tier includes government coverage.

8. The patient advocacy system as recited in claim 7, wherein said government coverage includes Medicaid.

9. The patient advocacy system as recited in claim 1, wherein at least one tier includes patients eligible for charity.

10. The patient advocacy system as recited in claim 1, wherein at least one tier includes coverage for specific populations.

11. The patient advocacy system as recited in claim 10, wherein said specific populations include crime victims.

12. The patient advocacy system as recited in claim 10, wherein said specific populations include military personnel.

13. The patient advocacy system as recited in claim 1, wherein at least one tier includes coverage for patients using disability as a source of coverage.

14. The patient advocacy system as recited in claim 1, wherein at least one tier includes coverage for patients with injuries.

15. The patient advocacy system as recited in claim 14, wherein said funding sources associated with the tier for patients with injuries includes auto insurance.

16. The patient advocacy system as recited in claim 15, wherein said funding sources associated with the tier for patients with injuries includes worker's compensation.

17. The patient advocacy system as recited in claim 15, wherein said funding sources associated with the tier for patients with injuries includes public liability insurance.

* * * * *